US009952836B2

(12) United States Patent
Ohara

(10) Patent No.: US 9,952,836 B2
(45) Date of Patent: Apr. 24, 2018

(54) WEB SERVER SYSTEM, APPLICATION DEVELOPMENT SUPPORT SYSTEM, MULTILINGUAL SUPPORT METHOD IN WEB SERVER SYSTEM, MULTI-DEVICE SUPPORT METHOD IN WEB SERVER SYSTEM, AND APPLICATION DEVELOPMENT SUPPORT METHOD

(71) Applicant: NOMURA RESEARCH INSTITUTE, LTD., Tokyo (JP)

(72) Inventor: Soichi Ohara, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 132 days.

(21) Appl. No.: 15/056,482

(22) Filed: Feb. 29, 2016

(65) Prior Publication Data

US 2016/0179481 A1 Jun. 23, 2016

Related U.S. Application Data

(63) Continuation of application No. PCT/JP2013/073193, filed on Aug. 29, 2013.

(51) Int. Cl.
*G06F 3/048* (2013.01)
*G06F 9/44* (2006.01)
(Continued)

(52) U.S. Cl.
CPC .............. *G06F 8/34* (2013.01); *G06F 9/4448* (2013.01); *G06F 17/2276* (2013.01);
(Continued)

(58) Field of Classification Search
CPC ...... G06F 8/34; G06F 9/4448; G06F 17/2276; G06F 17/2872; G06F 17/30292;
(Continued)

(56) References Cited

U.S. PATENT DOCUMENTS 6,182,099 B1 1/2001 Nakasato
6,577,319 B1 * 6/2003 Kashiwagi ............ G06F 3/0481 345/581

(Continued)

FOREIGN PATENT DOCUMENTS

JP 9-251463 9/1997
JP 11-3338 1/1999

(Continued)

OTHER PUBLICATIONS

Pérez-Quiñones, M. A., et al., Automatic Language Translation for User Interfaces, Proceedings of the 2005 conference on Diversity in computing, 2005, pp. 60-63, [retrieved on Jan. 8, 2018], Retrieved from the Internet: <URL:http://dl.acm.org/>.*

(Continued)

*Primary Examiner* — Geoffrey St Leger

(57) ABSTRACT

A system that generates source code of a Web application program. A typical embodiment includes a dictionary table for each language environment that uses identification information on the input/output item as a key to retain, as dictionary data, information made up of initial values of parameters of a parts object, and a dictionary processing unit that acquires the dictionary data corresponding to the identification information on the input/output item from the dictionary table of a specified language environment, and a response processing unit that uses the identification information on the input/output item corresponding to the parts object contained in a processing result as the key to acquire the information on the parameters of the parts object from the dictionary table of the specified language environment and to allow the screen to display a label control and/or an input/output control.

12 Claims, 9 Drawing Sheets

(51) Int. Cl.
*G06F 17/22* (2006.01)
*G06F 17/28* (2006.01)
*G06F 17/30* (2006.01)

(52) U.S. Cl.
CPC ...... *G06F 17/2872* (2013.01); *G06F 17/3056* (2013.01); *G06F 17/30292* (2013.01); *G06F 3/048* (2013.01)

(58) Field of Classification Search
CPC .... G06F 17/3056; G06F 3/048; G06F 3/0481; G06F 3/04817; G06F 3/0482; G06F 3/0484; G06F 3/04847
USPC .......................................................... 717/109
See application file for complete search history.

(56) References Cited

U.S. PATENT DOCUMENTS

| | | | | |
|---|---|---|---|---|
| 6,968,499 | B1 | 11/2005 | Minami et al. | |
| 7,240,360 | B1 * | 7/2007 | Phan | G06F 21/82 726/2 |
| 7,979,268 | B2 * | 7/2011 | Lee | G06F 17/2795 704/2 |
| 8,135,860 | B1 | 3/2012 | Brown et al. | |
| 8,171,460 | B2 * | 5/2012 | Pizzoli | G06F 9/4443 704/2 |
| 2003/0115552 | A1 * | 6/2003 | Jahnke | G06F 9/4448 715/201 |
| 2005/0165827 | A1 * | 7/2005 | Schmitt | G06F 9/4443 |
| 2006/0150125 | A1 * | 7/2006 | Gupta | G06F 8/38 715/864 |
| 2008/0320400 | A1 * | 12/2008 | Smith | G06F 8/38 715/760 |
| 2013/0253901 | A1 * | 9/2013 | Krack | G06F 17/289 704/2 |
| 2014/0172409 | A1 * | 6/2014 | Brunswig | G06F 9/4448 704/2 |
| 2015/0039287 | A1 * | 2/2015 | Han | G06F 9/4448 704/2 |

FOREIGN PATENT DOCUMENTS

| | | |
|---|---|---|
| JP | 2001-51821 | 2/2001 |
| JP | 2001-325098 | 11/2001 |
| JP | 2002-132646 | 5/2002 |
| JP | 2003-44474 | 2/2003 |
| JP | 2007-280189 | 10/2007 |
| JP | 2008-71212 | 3/2008 |
| JP | 2009-76099 | 4/2009 |
| JP | 2010-128861 | 6/2010 |
| JP | 2011-108076 | 6/2011 |
| JP | 2012-203614 | 10/2012 |
| JP | 5216935 | 3/2013 |
| JP | 2013-235382 | 11/2013 |
| JP | 2013-235387 | 11/2013 |
| JP | 2013-235388 | 11/2013 |

OTHER PUBLICATIONS

Zhou, Y., et al., Multilingual Web Retrieval: An Experiment on a Multilingual Business Intelligence Portal, Proceedings of the 38th Annual Hawaii International Conference on System Sciences, 2005, 10 pages, [retrieved on Jan. 8, 2018], Retrieved from the Internet: <URL:http://ieeexplore.ieee.org/>.*

Jones, M. C., et al., Wikifying your Interface: Facilitating Community-Based Interface Translation, Proceedings of the 6th conference on Designing Interactive systems, 2006, pp. 321-330, [retrieved on Jan. 8, 2018], Retrieved from the Internet: <URL:http://dl.acm.org/>.*

International Search Report dated Dec. 3, 2013, in corresponding International Application No. PCT/JP2013/073193.

"Web development that doesn't hurt", *Ruby on Rails*, <http://rubyonrails.org>, accessed Nov. 26, 2015.

* cited by examiner

```
     ⋮
array("A01", CF_dic("customer_name"));
     ⋮
CF_itemDic(..., "COMMON DICTIONARY",( "DROPDOWN LIST"), "customer_name", ...);
     ⋮
```
~101

"顧客名"
40 CHARACTERS
20 CHARACTERS
HALF-WIDTH CHARACTERS NO GOOD
FULL-WIDTH KANA
"あいうえお"
"NAME"
40
田中:1, 山本:2, 鈴木:3 customer_name 121
ja
DICTIONARY TABLE

データベース検索
検索条件入力
顧客名　山本　▼
田中
山本
鈴木

WEB SERVER SYSTEM, APPLICATION DEVELOPMENT SUPPORT SYSTEM, MULTILINGUAL SUPPORT METHOD IN WEB SERVER SYSTEM, MULTI-DEVICE SUPPORT METHOD IN WEB SERVER SYSTEM, AND APPLICATION DEVELOPMENT SUPPORT METHOD

CROSS-REFERENCE TO RELATED APPLICATIONS

This application is a continuation application filed under 35 U.S.C. § 111(a) of International Patent Application No. PCT/JP2013/073193, filed Aug. 29, 2013, the contents of which are incorporated herein by reference.

TECHNICAL FIELD

The present invention relates to effective techniques when applied to development techniques of applications in a Web server system.

BACKGROUND ART

In the background of development of IT techniques, globalization of businesses, and the like, the need that Web sites and Web applications are supported by a plurality of languages has been grown. As a method that enables access to Web sites and Web applications in a plurality of language environments, for example, as a conventionally used method, there is a method in which individual pieces of content which are translated into respective languages regarding the same content are prepared in advance and the individual pieces of content are automatically or manually selected and used in accordance with the language environment and the like used by the user. Also, other than this, various techniques to support multiple languages in application programs have been proposed.

For example, in Japanese Patent Application Laid-Open Publication No. 2003-44474 (Patent Document 1), a technique to provide dynamic language translation of a content section by determining the language based on a client and user information, determining a skeleton of the content section containing content elements, translating skeleton content elements into the language determined based on the client and user information utilizing a stored translation table of each skeleton content element or dynamic natural language translation of each skeleton content element, and integrating the translated skeleton content elements into the content section is described.

Also, for example, in Japanese Patent Application Laid-Open Publication No. H11-3338 (Patent Document 2), a technique that recognizes the target language based on information from an application (setting information on fonts and formats in accordance with each language and information indicating the type of application) or information set by an environment setting function on the side of a multilingual input system (information on conditions and priorities set to each language), enables input of a plurality of languages by performing Japanese input processing through a Japanese processing unit when the target language is Japanese, performing English input processing through an English processing unit when the target language is English, and performing Chinese input processing through a Chinese processing unit when the target language is Chinese, and efficiently creates a document by automatically switching each input system in accordance with the target language is described.

Also, for example, in Japanese Patent Application Laid-Open Publication No. H9-251463 (Patent Document 3), a technique in which when the language to be used is given to the management process via an input unit, the management process extracts the language conversion system necessary for inputting the language from a correspondence table of a language conversion system and font types corresponding to built-in languages, issues a switching instruction of the language conversion system to OS (Operating System), and issues a switching command of fonts to an application, and the application requests the OS to switch fonts based on the received command, and as a result, a single process that the user inputs the type of language to be used enables the management process to issue necessary instructions to each unit so as to allow for an easy switching of a language conversion system and fonts is described.

Also, for example, in Japanese Patent Application Laid-Open Publication No. 2010-128861 (Patent Document 4), a technique that enables multilingual support in database systems and the like by including, in the language setting unit that identifies the language environment of the client accessing an information processing apparatus and sets the language environment, a client connection processing unit that sets a language identification value specifying a language environment of a client, a command processing unit that determines the presence of a command requesting multilingual processing by inspecting a script contained in an access request, and a language resource processing unit that, when the command processing unit determines to request multilingual processing, receives the command and allows access to a database in the language environment set by a language setting unit is described.

Also, with remarkable improvements in performance of mobile terminals due to development of IT techniques, access to Web sites via the Internet or the like is not limited to conventional PCs (Personal Computers) or the like but carried out by various kinds of devices such as mobile phones, smartphones, and tablet terminals. These devices have mutually different sizes and resolutions of the display to display the screen of Web sites. Thus, regarding a construction of a Web site or a Web application, multi-device support that optimizes the screen display for a plurality of these devices is considered while preventing an increase in load of development or maintenance.

Methods of such multi-device support include, for example, as a method that has been practiced, there is a method by which respective individual pieces of content regarding the same content which are adjusted or optimized for the sizes and resolution of the displays of respective devices, respectively, are prepared in advance and such individual pieces of content are automatically or manually selected to use in accordance with the device or the like used by the user. Moreover, supporting a plurality of devices by dynamically changing or generating content in an application program without changing the same source code is also discussed.

In association with dynamically changing content, for example, in a technique described in Japanese Patent Application Laid-Open Publication No. 2001-51821 (Patent Document 5), if a servlet having display area identifying information and display attributes as parameters is defined in a page template and the servlet is recognized by a Web server, a plurality of parts Bean associated with the display area identifying information is identified. The parts have image data of objects to be embedded in the display area thereof and linked URL (Uniform Resource Locator) information set thereto as properties and display condition information such as schedule information associated therewith. Display conditions of each of the plurality of parts Bean associated with the display area identifying information are examined, and based on link information as a property satisfying display conditions, image data forming objects to be embedded in the display area and linked URL information are acquired to generate HTML (HyperText Markup Language). Accordingly, content to be embedded in a page template can dynamically be changed without correcting the server program.

Also, for example, in a technique described in Japanese Patent Application Laid-Open Publication No. 2009-76099 (Patent Document 6), a service providing apparatus includes a display apparatus, a communication unit, an acquisition unit that acquires execution code to provide a service via the communication unit, an execution code storage unit that stores the acquired execution code, and a screen configuration information storage unit that stores screen configuration information defining the configuration of the screen displayed during execution of execution code. In addition, a management unit that manages respective units such that execution code necessary for providing a service and screen configuration information are stored in the execution code storage unit and the screen configuration information storage unit, respectively, before the service is provided and in response to receiving an instruction to provide the service, executes the execution code stored in the execution code storage unit by using the screen configuration information stored in the screen configuration information storage unit is included. Accordingly, when needed for providing the service, the latest execution code or screen configuration information is acquired, and while effectively managing the execution code and screen configuration information stored in the apparatus, the latest service can be provided.

Also, for example, in a technique described in Japanese Patent Application Laid-Open Publication No. 2002-132646 (Patent Document 7), a Web proxy server determines the client type by processing a client request generated by a client device and searches for Web content identified in the client request. Also, the Web proxy server searches for one or a plurality of augmentation files related to Web content and a specific client type, thereby changing the Web content and delivering the changed Web content to the client device. Accordingly, there is no need to own or control the Web proxy server, and Web content can be converted or supplemented to efficiently support different clients.

Also, for the purpose of, for example, reducing or standardizing development loads in developing a Web application program or the like, application frameworks such as so-called integrated development environments (IDE: Integrated Development Environment) including GUI (Graphical User Interface) creating function and Ruby on Rails (RoR, Non-Patent Document 1) and the like are frequently used in many cases. Moreover, such frameworks are also used in combination. By using such development support tools and the like, for example, regarding a Web application program having a user interface, source code can automatically be generated.

However, in these development support tools, for the application in which the source code is automatically generated, when the contents displayed on the screen are then further changed, adjusted, or the like (for example, changes of display items or controls (components) on the screen and attributes thereof), a cumbersome process needs to be followed. For example, it is necessary to correct settings, definitions, or the like of the contents displayed on the screen using the GUI creation function or the like serving as the development support tool, generate source code again automatically, further build and the like if necessary, and then carry out a work, such as replacement of created modules. Such a work may not only be a burden on the developer, but also become a factor of inviting a failure.

In contrast, for example, in Japanese Patent Application Laid-Open Publication No. 2007-280189 (Patent Document 8), such a technique in which in a program generation apparatus that generates a program for changing settings of the screen displayed from the display screen provided in a server, when the screen is changed, a screen item information management unit creates a display item file based on screen item information, an input item/column corresponding unit creates an input item file based on table item information, an output item/column corresponding unit creates an output item file based on the table item information, and further a program generator generates a screen program and a server program by using the display item file, the input item file, and the output item file, so that the screen can be changed without changing source code of a screen program and a server program is described.

RELATED ART DOCUMENTS

Patent Documents

Patent Document 1: Japanese Patent Application Laid-Open Publication No. 2003-44474

Patent Document 2: Japanese Patent Application Laid-Open Publication No. H11-3338

Patent Document 3: Japanese Patent Application Laid-Open Publication No. H9-251463

Patent Document 4: Japanese Patent Application Laid-Open Publication No. 2010-128861

Patent Document 5: Japanese Patent Application Laid-Open Publication No. 2001-51821

Patent Document 6: Japanese Patent Application Laid-Open Publication No. 2009-76099

Patent Document 7: Japanese Patent Application Laid-Open Publication No. 2002-132646

Patent Document 8: Japanese Patent Application Laid-Open Publication No. 2007-280189

Non-Patent Document

Non-Patent Document 1: Internet Web page: rubyonrails.org

SUMMARY OF THE INVENTION

Problems to be Solved by the Invention

By utilizing conventional techniques described in Patent Documents 1 to 4 described above, for example, processes such as translating content in accordance with the language environment of the client terminal or the like or displaying translated content, or switching IME (Input Method Editor: character conversion program) or fonts can dynamically be performed without changing source code. Also, switching the language and the like in accessing a database is possible.

However, according to these techniques, for example, in an application that accesses a business database, regarding various controls (screen components) such as input fields to input search conditions, the appearances, attributes, control processing, and the like thereof cannot be dynamically switched in accordance with the language environment of the client terminal. For example, when the language environment of the client terminal is changed from Japanese to English, text displayed on the screen by a text control and the like is in English, but attributes and the like of controls such as an input field to input data remain those of Japanese.

That is, for example, the mode of IME remains the full-width hiragana, or the length of a character string that can be input or displayed remains the number of characters in Japanese. Also, in the case of an application that registers data which is input to an input field on the screen in a business database or the like, although validity of data specified in the input field or the like may be checked in some cases, the check on the contents remains the check intended for input data in Japanese.

Incidentally, in the techniques described in Patent Documents 2 and 3, the mode of IME, fonts, and the like can be changed in accordance with the language environment of the client terminal, but the appearances and attributes of controls such as the input field and control processing such as a validity check cannot be dynamically changed.

Thus, an object of the present invention is to provide a multilingual Web server system capable of dynamically changing a user interface including the appearances and attributes of controls to display input/output items on the screen, control processing, and the like in a Web application in accordance with the language environment without changing source code and a multilingual support method in the Web server system.

On the other hand, as described above, to provide a Web site or a Web application with multi-device support, it is necessary to optimize the contents of the screen display in accordance with the type of device of the client terminal, particularly the size and resolution of the display. Particularly, smartphones and tablet terminals employ a touch panel as an input/output device, and the user performs an operation by directly touching on the screen, instead of using a mouse. Therefore, dynamic changes of the contents of the screen here mainly center on optimization of the appearances such as the arrangement and size of components (controls) on the screen in such a way that visual recognition and operations by fingers are easily performed.

On this point, for example, in the technique described in Patent Document 5, content can dynamically be changed in a server in accordance with display conditions, but changes such that content is optimized in consideration of the state of the client terminal are not featured. In contrast, in the above technique described in Patent Document 6, content can dynamically be changed in consideration of the state of the client terminal by retaining execution code, screen configuration information, and the like on the side of the client terminal. However, such a configuration causes a problem when a device having limited processing capabilities or storage capacities such as a mobile terminal is used as the client terminal.

Also, in the technique described in Patent Document 7, an augmentation file is acquired in accordance with the environment of the client terminal and content can dynamically be changed accordingly. However, regarding how to efficiently implement the technique, no concrete implementation technique and the like has not been disclosed. Also, in a configuration having no proxy server, the efficient way of implementing the technique has not been disclosed as well.

Thus, in a Web application, another object of the present invention is to provide a multi-device support Web server system capable of dynamically changing the user interface including the appearances and attributes of controls to display input/output items on the screen, control processing, and the like in accordance with the device of the client terminal without changing source code, and a multi-device support method in the Web server system.

Also, by utilizing the technique described in Patent Document 8, the contents of the screen display can be changed without changing the source code. However, in the technique described in Patent Document 8, while which item is displayed as an input/output item on the screen and the correspondence relation between the display item and the column of a database can be changed, it is difficult to dynamically carry out a work such as constructing a user interface while adjusting, for example, the appearance and attributes of each control which displays an input/output item, by trial and error, without changing the once-created source code or if changed, by making simple changes only.

Thus, still another object of the present invention is to provide an application development support system capable of dynamically changing the appearances and attributes of controls displaying an input/output item on the screen by automatically generating source code of a so-called CRUD (Create, Read, Update, Delete) type application program on a database and then without changing the generated source code or if changed, by making simple changes only, and an application development support method.

The above and other preferred aims and novel characteristics of the present invention will be apparent from the description of the present specification and the accompanying drawings.

Means for Solving the Problems

The typical inventions disclosed in the present application will be briefly described as follows.

A multilingual support Web server system according to a typical embodiment of the present invention includes a request processing unit that invokes a corresponding business logic in response to a request from a client terminal and a response processing unit that returns a processing result by the business logic to the client terminal and operates an application program providing a service to the client terminal in a plurality of language environments, having the following characteristics.

That is, the Web server system further includes a dictionary table for each of the language environments that uses identification information on an input/output item in the application program as a key to retain, as dictionary data, information made up of initial values of one or more parameters of a parts object having at least information on a display name showing text of a label control of one or more of the input/output items displayed on a screen of the client terminal and information about an input/output control displayed to carry out input or output of the input/output item, and a dictionary processing unit that acquires the dictionary data corresponding to the identification information on the input/output item from the dictionary table of a specified language environment.

Also, the response processing unit uses the identification information on the input/output item corresponding to the parts object contained in source code as the key to acquire the information on part or all of the parameters of the corresponding parts object from the dictionary table of the specified language environment via the dictionary processing unit and based on the acquired parameters and the processing result, generates HTML data allowing the screen of the client terminal to display the label control and/or the input/output control corresponding to the parts object.

Also, a multi-device support Web server system according to another typical embodiment of the present invention includes a request processing unit that invokes a corresponding business logic in response to a request from a client terminal and a response processing unit that returns a processing result by the business logic to the client terminal and operates an application program providing a service to the client terminal made up of a plurality of types of devices.

That is, the Web server system further includes a device acquisition unit that acquires information about a type of device of the client terminal based on the request from the client terminal, and the response processing unit generates HTML data allowing a screen of the client terminal to display a label control and/or an input/output control corresponding to a parts object contained in source code and having at least information on a display name showing text of the label control of one or more input/output items displayed on a screen of the client terminal and information about the input/output control displayed to carry out input or output of the input/output item, based on first adjustment content in displaying the label control and/or the input/output control, the first adjustment content being implemented in an upper class from which the parts object is inherited and depending on the type of the device of the client terminal acquired by the device acquisition unit.

Also, an application development support system according to another typical embodiment of the present invention includes a code generating server that generates source code of a Web application program operating on an application server.

That is, the application development support system further includes a dictionary server having a dictionary table that uses identification information on one or more input/output items displayed on a screen during execution of the Web application program as a key to retain, as dictionary data, information made up of initial values of one or more parameters of a parts object having at least information on a display name showing text of a label control of the input/output item and information about an input/output control displayed to carry out input or output of the input/output item, and the code generating server includes a code generator that constructs the Web application program by invoking the parts object for displaying each of the input/output items on the screen and generates the source code of the constructed Web application program.

When invoked to display a corresponding input/output item on the screen during execution of the Web application program on the application server, the parts object uses the identification information on the input/output item as the key to acquire information on part or all of the parameters of the parts object from the dictionary table on the dictionary server and based on the acquired parameters, displays the label control and/or the input/output control.

Effects of the Invention

The effects obtained by typical ones of the inventions disclosed in the present application will be briefly described below.

According to a typical embodiment of the present invention, in a Web application, the user interface including the appearances and attributes of controls to display an input/output item on the screen, control processing, and the like can dynamically be changed in accordance with the language environment without changing source code.

Also, according to another typical embodiment of the present invention, the user interface including the appearances and attributes of controls to display an input/output item on the screen, control processing, and the like in a Web application can dynamically be changed in accordance with the device of the client terminal without changing source code.

Also, according to still another typical embodiment of the present invention, the contents of the screen such as the appearances and attributes of controls displaying an input/output item on the screen can dynamically be changed by automatically generating source code of a CRUD type application program on a database and then without changing the generated source code or if changed, by making simple changes only.

BRIEF DESCRIPTIONS OF THE DRAWINGS

DETAILED DESCRIPTION OF PREFERRED EMBODIMENTS

Figure 1:
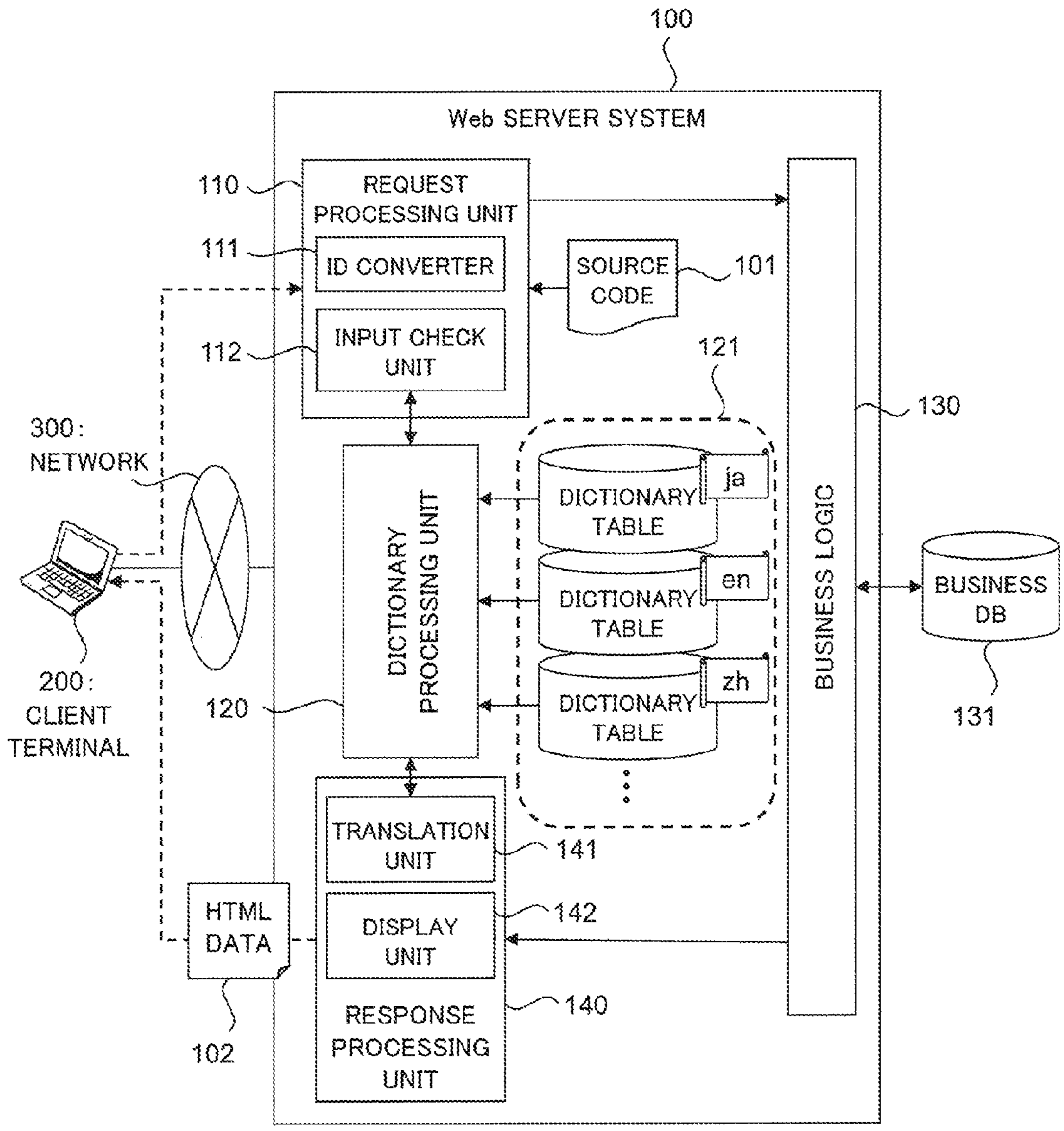
FIG. 1 is a diagram showing an overview of a configuration example of a Web server system as a first embodiment of the present invention.

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

A Web server system as the first embodiment of the present invention creates and retains a dictionary for each language environment so that a user interface for a plurality of languages can be provided without changing source code. It is assumed that the dictionary not only simply retains translations of text data such as the display name by each language, but also can manage various kinds of attribute information and the like of items as a data dictionary. That is, information specific to each language in the user interface can be retained as dictionary data.

By using such dictionaries, for example, an application can be developed in a plurality of languages simultaneously in parallel, and also a support language can easily be added, so that extensibility can be improved. Also, by using such dictionaries as data dictionaries, data items can be standardized in the system.

In the present embodiment, for example, in a CRUD type Web application program accessing a business database, it is assumed that, instead of directly using a standard control object (hereinafter, which may simply be denoted as a "control"), a parts object into which each piece of data such as the display name, the setting content and control processing of a control, and explanatory text are integrated is used to display the content related to an input/output item (for example, an input item specifying a content of search conditions for acquiring data from a database or an output item displaying a content of a search result) on the screen.

The parts object can be specified what kind of control displayed on the screen as a parameter (for example, a text control only, a (text control and) input field, a (text control and) dropdown list, and the like). Also, it is assumed that attribute values (for example, the content of text displayed in a text control, the length of an input field, and the like) of a control, control information (for example, how to perform a validity check of input data and the like), and the like can be specified, and the parts object is implemented to display and control a control according to the specified content.

In other words, the parts object is configured to combine and display an input/output control dealing with data of an input/output item such as an input field, a dropdown list, and text and a label control as a text control that displays the name or the like of an input/output item and has a configuration that output patterns of these controls can be specified.

In this processing, attribute values of the label control and the input/output control, such as the width of controls, can be adjusted collectively in the form of consistency, and thus, there is no need to carry out a cumbersome process that the user individually specifies attribute values and the like to have consistency, so that the appearance of the displayed controls can be adjusted. The adjustments include, for example, adjusting each of the display width of the label control and the input/output control integrally to prevent the label control from being started as a new line at an unintended location in a displayable area or conversely to prevent the label control from not being started as a new line at an intended location.

In the present embodiment, the source code of a Web application program is created under the assumption that the content of each input/output item on the screen is displayed using the parts object. That is, a control is indirectly displayed by using the parts object (at the time of execution on a Web server system, the parts object dynamically generates HTML, a script, and the like that display the target control). Also, information about mapping between each column of the database to be accessed and the input/output item on the screen is retained in source code as mapping information between identification information (for example, the column name) on each column of the database and identification information (for example, the ID attribute value of HTML) on the corresponding parts object.

Further, in the present embodiment, as will be described below, excluding part thereof, information and the like about text displayed in the label control, attribute values of the input/output control, and control processing in each parts object are not directly specified in source code, but are externally retained as dictionary data associated with identification information on ID of a parts object or the corresponding column name or the like of the database. By defining the content of the dictionary data for each language environment and referring to the dictionary data corresponding to the target language environment during execution, the appearance, attributes, and the like of a control displayed on the screen by the parts object can dynamically be changed in accordance with the language environment without changing once-generated source code.

<System Configuration>

FIG. 1 is a diagram showing an overview of a configuration example of a Web server system as the first embodiment of the present invention. A Web server system 100 is made up of, for example, a computer device such as a server device or a virtual server in a cloud computing environment and includes, in addition to middleware such as OS, DBMS (DataBase Management System), and a Web server program (not shown), each unit such as a request processing unit 110 implemented by source code 101 created by a user or a software program such as a library or an object invoked therefrom, a dictionary processing unit 120, a business logic 130, and a response processing unit 140. Also, a dictionary table 121 implemented by a database, a file table, or the like is included.

In response to a request from a program such as a Web browser (not shown) on a client terminal 200 connected via a network 300 such as the Internet, the Web server system 100 provides a service by accessing a business database (DB) 131 through the business logic 130, performing processing, and outputting HTML data 102 to the client terminal 200 to respond to the request.

The request processing unit 110 has a function to invoke, in response to a request from the client terminal 200, content (business logic 130) based on the source code 101 corresponding thereto and includes units such as an ID converter 111 implemented by a software program and an input check unit 112. The ID converter 111 has a function to convert identification information (ID) on a parts object corresponding to an input item on the screen contained in a request message into identification information (such as the column name) on the column of the business DB 131 corresponding to the input/output item based on mapping information retained in the source code 101.

The mapping information retains the correspondence between identification information (for example, the ID attribute value of HTML) on a parts object displayed on the screen and identification information (such as the column name) on each column of the business DB 131 to be accessed. Accordingly, as will be described below, each parts object arranged on the screen in the source code 101 first acquires the column name corresponding to ID of the parts object by the ID converter 111 and then can perform subsequent processing such as accessing the business DB 131 and acquiring dictionary data from the dictionary table 121 described below by using the column name as a key.

Thus, in the HTML data 102 responding to the client terminal 200, there is no need to directly specify the column name of the corresponding business DB 131 in a (control displayed by) each parts object as information such as a key, and ID of the parts object can be used as information such as a key, so that security can be increased by hiding the actual column name from the HTML data 102. Incidentally, the column name of the corresponding business DB 131 may directly be specified as information such as a key in a (control displayed by) each parts object in the HTML data 102 without making such a conversion.

The input check unit 112 has a function to perform general validity checks of the content of data in an input item specified via a (control displayed by) a parts object on the screen contained in a request message. As types of validity checks, for example, the number of characters, character types (such as numbers, alphabets, kana, and half-width/full-width characters), limitations of usable characters, and format checks of the date/time and various code values can be considered.

The content of a validity check may depend on the language environment. Thus, in the present embodiment, a plurality of types of validity checks in consideration of variations of each language are implemented in the input check unit 112, and which type to use for the target input item is selected or determined in accordance with the language environment. Here, the dictionary table 121 of the target language is accessed via the dictionary processing unit 120 described below and information about the type of a validity check is acquired and determined from the content of dictionary data corresponding to the target input item.

The dictionary processing unit 120 has a function to acquire and output dictionary data corresponding to the specified key (in the present embodiment, for example, the column name of the business DB 131 corresponding to the target input/output item (parts object)) from the dictionary table 121 of the specified language. The specified language, for example, may be acquired from the language environment of a Web browser contained in a request message from the client terminal 200 or the value of the language defined for each Web site operating on the Web server system 100 may be acquired. The example of FIG. 1 shows that the dictionary table 121 of each language such as Japanese ("ja"), English ("en"), and Chinese ("zh") is retained.

The content and format of dictionary data in the dictionary table 121 are not specifically limited. In the present embodiment, as a simple technique, for example, as will be described below, various kinds of data (attribute values of parts objects for carrying out input/output, parameters necessary for controlling, and the like) necessary for carrying out input/output processing of data to/from the target column of the business DB 131 via the screen are to be specified by commas or the like in a predetermined order. More specifically, for example, the display name as the content when a label control is displayed in the corresponding parts object, the length (number of characters) when an input field is displayed as an input/output control, the specification related to the content of control processing such as the type of validity check and the mode of IME, the abbreviated display name as abbreviated text and display width when output data is listed as a table, and a value list when displayed as a dropdown list or the like can be considered.

The business logic 130 has a function to perform processing as a business application by utilizing the business DB 131. In the present embodiment, as described above, the business logic 130 is intended for CRUD type applications on the business DB 131 but is not specifically limited to such applications.

The response processing unit 140 has a function to generate the HTML data 102 based on a processing result of the business logic 130 or the like based on the content of the source code 101 and return to the client terminal 200 and includes units such as a translation unit 141 and a display unit 142 implemented by a software program. The translation unit 141 acquires text of the label control and parameter values such as attribute values of the input/output control and control information to display the corresponding parts object under the target language environment for each output item contained in a returned response. Here, the dictionary table 121 of the corresponding language is accessed via the dictionary processing unit 120, and the display name and various parameter values such as attribute values are acquired from the dictionary data corresponding to the target output item (parts object).

The display unit 142 has a function to generate the HTML data 102 of a response screen in which controls displayed by each parts object are arranged based on text of the label control and parameter values such as attribute values of the input/output control and control information on each parts object acquired by the translation unit 141.

<Screen Display Processing>

Figure 2:
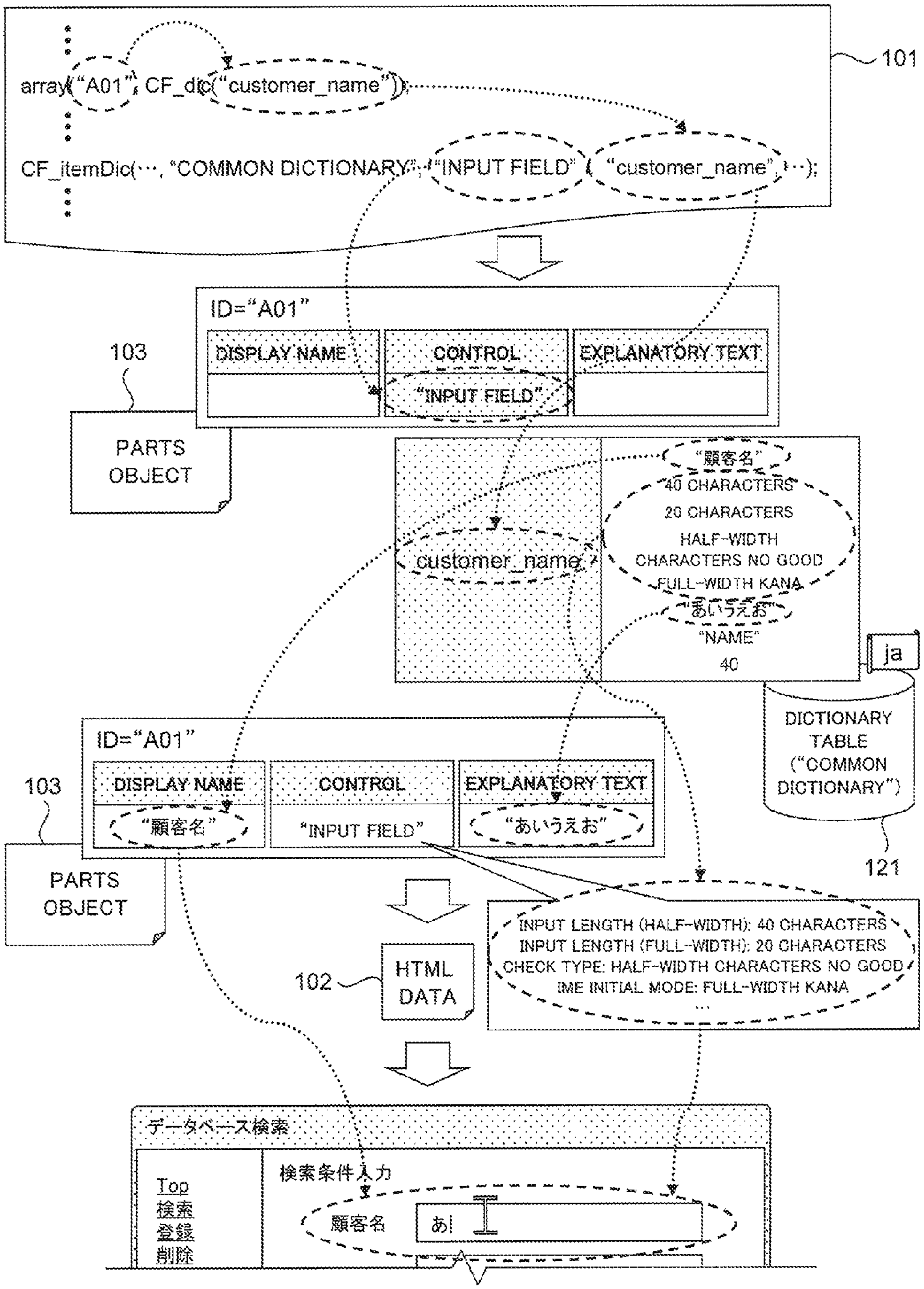
FIG. 2 is a diagram showing an overview of an example of processing when an input/output item of a corresponding column is displayed on the screen by a parts object according to the first embodiment of the present invention.

FIG. 2 is a diagram showing an overview of an example of processing when an input/output item of a corresponding column is displayed on the screen by a parts object in a CRUD type application. In the example of FIG. 2, a case of displaying the input field specifying "顧客名" is extracted from the screen on which search conditions at the time of reading out data from the business DB 131 in a Japanese environment are input.

In the source code 101 of the Web application program shown in an upper portion of FIG. 2, a parts object 103 to display the input field of specifying "顧客名" is invoked. More specifically, information on the column name ("customer_name") corresponding to the ID ("A01") is first acquired from the mapping information (in the example of FIG. 2, the correspondence relation is retained by array( )) retained in the source code 101.

Then, for example, a subclass inherited from a class implementing the function of the parts object 103 is invoked by creating an instance thereof ("CF_itemDic( );"). In the example of FIG. 2, a state in which the type ("common dictionary") of the dictionary table 121 to be invoked, the type ("input field") of the input/output control displayed, the ID attribute value ("A01") of HTML, and the like are specified as part of parameters and invoked is shown in a simplified form. Incidentally, the ID attribute value ("A01") of HTML is dynamically converted into the column name ("customer_name") based on the mapping information.

The parts object 103 invoked by the code described above retains data including at least the display name (text of the label control) and information about the content of the input/output control displayed as data. As shown in FIG. 2, other information such as explanatory text may further be retained. In the example of FIG. 2, the explanatory text is set because the "input field" is specified in the source code 101 as a parameter for the control among the above-described three pieces of information on the parts object 103.

The invoked parts object 103 further accesses the target dictionary table 121 ("common dictionary") in the Japanese environment ("ja") via the dictionary processing unit 120 using a predetermined function, method, or the like to acquire dictionary data (in the present embodiment, a set of a plurality of values such as "顧客名," 40 characters, 20 characters, and the like) corresponding to the column name ("customer_name").

In the example of FIG. 2, information on the name (text displayed in the label control), the length (number of half-width characters) in the case of an input field, the maximum length (number of characters) in the case of an input field, the type of validity check of input data, the initial mode of IME, the explanatory comment, text (display name) when listed as a table, and the display width (pixel value) when listed as a table is retained from above as dictionary data of the dictionary table 121. Incidentally, as the output format when the dictionary data is acquired, for example, these values may be delimited by commas or the like as a series of character strings or may be accessible data such as an associative array.

Regarding the dictionary table 122, when the processing efficiency is considered, it is desirable to expand the content of dictionary data of the dictionary table 121 onto a memory upon initial processing or first access. In this case, if all dictionary data is expanded, the processing efficiency is adversely reduced in some cases, for example, a memory usage volume is occupied, or an expansion processing takes time. Thus, in terms of implementation, it is desirable to make dictionary data in a necessary range expandable in a memory when needed.

Therefore, the present embodiment is configured to have a hierarchical structure including a plurality of the dictionary tables 121 with different application ranges and select to use these dictionary tables 121 as appropriate. For example, a plurality of types of the dictionary tables 121 with different application ranges, for example, a dictionary ("common dictionary") common to all of systems and applications working in the Web server system 100, a dictionary ("site dictionary") common only in a specified Web site, a dictionary ("library dictionary") common only in a subsystem, and a dictionary ("controller dictionary") for each screen are assumed to be included.

In this case, for example, if applicable dictionary data is not obtained by referring to a dictionary of a narrow application range such as the "controller dictionary," the dictionary table 121 in the higher level (with wider application ranges) can be reversely referred to in ascending order of, the "library dictionary," "site dictionary," and "common dictionary." Alternatively, a default value may be used or an error may be output when no dictionary data is obtained.

The parts object 103 extracts necessary data from the acquired dictionary data and sets the data as parameters when a control is displayed or controlled. For example, as attribute values when an input field is displayed as an input/output control, the length of the field acquired from the dictionary data is set, and the type of validity check, values of the initial mode of IME, the content of the explanatory text, and the like are also set. Incidentally, processing related to the control of the input/output control such as a validity check of input data and the mode setting of IME is the function of the input check unit 112 and the display unit 142, and as concrete implementation, these functions are implemented as functions owned by the parts object 103 or functions invoked by the parts object 103 by, for example, defining these functions as methods in a class from which the parts object 103 is inherited.

Accordingly, as shown in a screen example in a lower portion of FIG. 2, the parts object 103 can generate the HTML data 102 such that the control of an input field to specify "顧客名" is displayed during execution. At this point, for example, information on the explanatory text of the parts object 103 can be used as help information or the like on the relevant input/output item.

Incidentally, when an input field is displayed, if only the control of the input field is displayed, what to input is unknown and thus, in the present embodiment, as shown in FIG. 2, a text control ("顧客名") displaying the display name of the input/output field corresponding to the parts object 103 is displayed next to the input field as a label (label control). As the text, information on the display name in retaining data of the parts object 103, that is, the value ("顧客名") of the name of the dictionary data acquired by the parts object 103 from the dictionary table 121 is set.

The processing related to generation of the HTML data 102 is a function of the display unit 142 or the like, and as concrete implementation, the function is implemented as a function owned by the parts object 103 or a function invoked by the parts object 103 by, for example, defining the function as a method in a class from which the parts object 103 is inherited. Incidentally, here, as described above, attribute values related to the appearance and the like of three elements of the label control displayed, the input/output control, and the explanatory text are adjusted collectively in the form of consistency.

Thus, in the present embodiment, the HTML data 102 that displays an input/output item by the parts object 103 can be generated. Therefore, a CRUD type application in the present embodiment can be implemented by arranging the parts object 103 on the screen by predetermined rules as an input/output item corresponding to each column of the business DB 131 and creating the source code 101 so as to be combined with implementation of standard functions and operations. Also, as an application program development support system or the like, a function to automatically generate the source code 101 described above can be implemented.

For example, as an application of registering (C: Create) an entry in the business DB 131, the source code 101 is created such that the parts objects 103 to display the input field specifying data to be registered in each column of the business DB 131 on the screen are arranged in the order in which the columns of the business DB 131 are arranged. At this point, the correspondence relation between ID of the control displayed on the screen and the name of the column is retained as mapping information if necessary. Further, the "register" button to register an entry in the business DB 131 and the "cancel" button are arranged as standard functions. Further, information such as attribute values and control information used to display a control of each parts controls 103 is retained in the dictionary table 121 of each language environment as dictionary data. At this point, if not specifically specified for each item, the default value is set for each item.

Also, for example, as an application of, searching (R: Read) the business DB 131, like the above case, the source code 101 is created such that the parts object 103 to display the input field specifying conditions for searching the business DB 131 on the screen is arranged. At this point, if search conditions for all columns of the target table of the business DB 131 are specifiable, processing may be too much and thus, for example, the display is simplified such as provisionally displaying the input field for the first five columns only, which may be made changeable later. Also, the correspondence relation between ID of the control displayed on the screen and the name of the column is retained as mapping information if necessary. Further, the "search" button or the like to search for an entry of the business DB 131 is arranged as a standard function.

Also, for example, a table (table) control to display a search result is automatically arranged, below a region where search conditions are input. Here, for example, the content corresponding to an invocation of the parts object 103 corresponding to each column of the business DB 131 is set to an item definition array of the object of the table control. Accordingly, the display unit 142 or the parts object 103 can be implemented such that the content of each column of the business DB 131 is displayed in each column of the table control.

Figure 3:
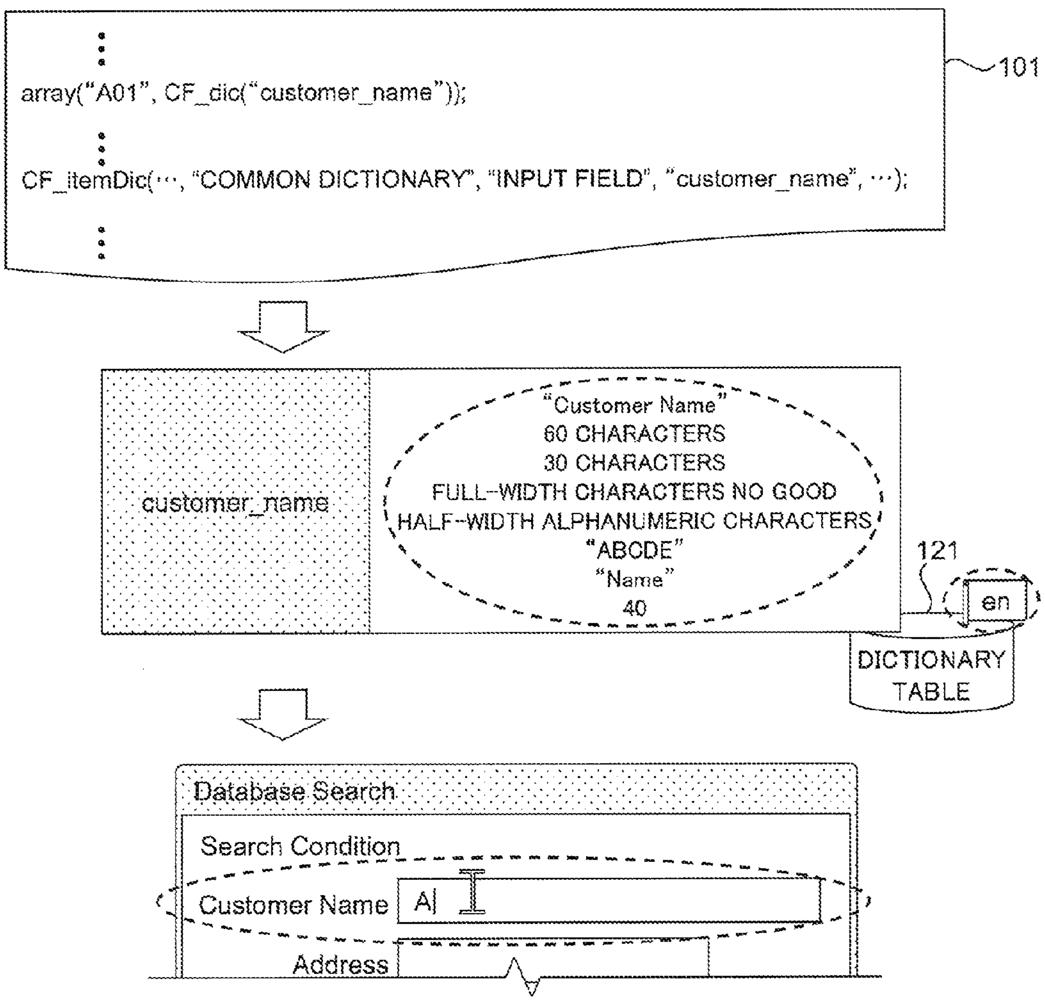
FIG. 3 is a diagram showing an overview of an example of processing when the appearance and the like of a control displayed by the parts object according to the first embodiment of the present invention is changed into another language.

To provide support for the Web application in a different language in this state without changing the content of the source code 101, the dictionary table 121 of the target language may be prepared. FIG. 3 is a diagram showing an overview of an example of processing when the appearance and the like of a control displayed by the parts object 103 is changed into another language. Here, the dictionary table 121 of the English environment ("en") is newly created without changing the content of the source code 101 shown in the example of FIG. 2.

Accordingly, when the Web application is executed, the parts object 103 refers to the content of the relevant entry in the target dictionary table 121 in the English environment ("en") and dynamically changes, in accordance with the content, as shown in a screen example in a lower portion of FIG. 3, not only text data of the label control as the display name, but also attributes (in the example of FIG. 3, the length (width) of an input field, the content of a validity check of input data, the mode of IME, and the like) of the input/output control to the English environment.

Figure 4:
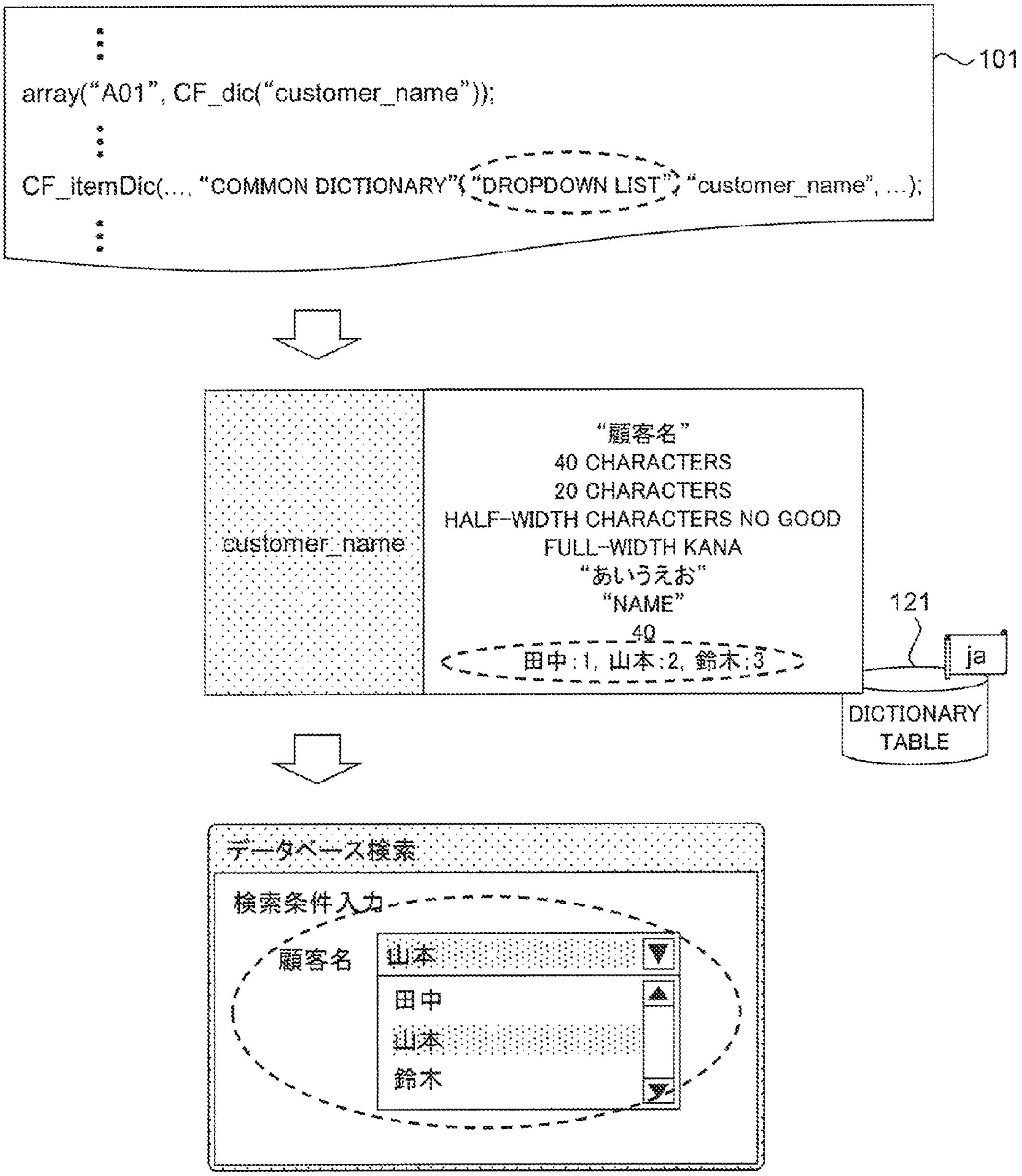
FIG. 4 is a diagram showing an overview of an example of processing when the appearance and the like of a control displayed by the parts object according to the first embodiment of the present invention is changed.

Also, FIG. 4 is a diagram showing an overview of an example of processing when the appearance and the like of a control displayed by the parts object 103 is changed. Here, the content of the source code 101 shown in the example of FIG. 2 is slightly changed. More specifically, when the parts object 103 is invoked, the parameter of the type of the input/output control displayed is changed from the "input field" to the "dropdown list." Also, the content ("田中: 1, 山本: 2, . . . ") of a value list set to the dropdown list is additionally defined at the end of the dictionary data in the dictionary table 121.

Accordingly, when the Web application is executed, the parts object 103 can generate the HTML data 102 such that the display content of an input/output item is changed by an input/output control of the specified type. In the example of FIG. 4, although the input/output control is changed from the input field to the dropdown list for the same parts object 103, for example, if the parameter of the type of the input/output control is set to "text," the parts object 103 displays the value as text. It is also possible to display only either one of the label control and the input/output control. Also, if a parameter is set to "hide," although data is internally retained, the control of the relevant input/output item is prevented from being displayed on the screen.

As described above, according to the Web server system 100 as the first embodiment of the present invention, information (text data such as the display name of an input/output item and information on various attributes) specific to each language in the user interface of a Web application program is retained in the dictionary table 121 of each language environment as dictionary data. Also, when displaying an input/output item on the screen, a Web application indirectly displays a standard control using the parts object 103, instead of directly using a standard control.

The parts object 103 acquires corresponding dictionary data from the dictionary table 121 corresponding to the language environment and dynamically changes, based on the content thereof, the user interface including the appearance, attributes, control processing, and the like of a control to display an input/output item on the screen. Accordingly, the user interface can dynamically be changed in accordance with the language environment without changing the source code 101 of an application.

Incidentally, the present embodiment is intended for standard CRUD type Web applications but is not limited to such applications. Based on the same concept, the user can provide multilingual support by defining the dictionary table 121 for each language environment for a specific application (which may be not only a Web application, but also a client/server type, standalone type, or the like) constructed in the form of combining the dictionary table 121 and the parts object 103, also including operation content such as the user interface and business logic.

Second Embodiment

A multi-device support Web server system as the second embodiment of the present invention can provide a user interface to client terminals made up of a plurality of types of devices without changing source code. Here, as will be described below, a function capable of the optimal display by adjusting the display method of an input/output item for each device displayed is included in the function that displays the screen itself or a control displayed on the screen. Accordingly, for example, an application can be developed concurrently for a plurality of devices, and also, a device to which support is provided can easily be added so that extensibility can be improved.

In the present embodiment, similarly to the first embodiment, for example, in a CRUD type Web application program accessing a business database, instead of directly using a standard control object (which may simply be called a "control" hereinafter), a parts object, described below, in which the display name and each piece of data of the setting content, control processing, and explanatory text of a control are integrated is used to display the content related to an input/output item (for example, an input item to specify the content of search conditions to acquire data from the business database or an output item to display the content of a search result) on the screen.

Such a parts object can specify what kind of control (for example, a text control only, (a text control and) an input field, (a text control and) a dropdown list, and the like) to display on the screen as a parameter. Also, the parts object can specify attribute values (for example, the content of text displayed in a text control and the length of an input field), control information (for example, how to perform a validity check of input data), and the like of a control and is implemented such that the control is displayed and controlled according to the specified content.

In other words, the parts object is configured to combine and display an input/output control dealing with data of an input/output item such as the input field, dropdown list, and text, and a label control as a text control that displays a name or the like of the input/output item and has a configuration that output patterns of these controls can be specified.

In this processing, attribute values of the label control and the input/output control, such as the width of controls, can be adjusted collectively in the form of consistency, and thus, there is no need to carry out a cumbersome process that the user individually specifies attribute values and the like to have consistency, so that the appearance of the displayed controls can be adjusted. The adjustments include, for example, adjusting each of the display width of the label control and the input/output control integrally to prevent the label control from being started as a new line at an unintended location in a displayable area or conversely to prevent the label control from not being started as a new line at an intended location and adjusting the display position, width, and the like of an input/output control having a different appearance depending on the device or OS, such as a radio button, integrally with the label control.

In the present embodiment, similarly to the first embodiment, the source code of a Web application program is created under the assumption that the content of each input/output item on the screen is displayed using the parts object. That is, a control is indirectly displayed by using the parts object (at the time of execution on a Web server system, the parts object dynamically generates HTML, a script, and the like that display the target control). Also, information about mapping between each column of the database to be accessed and the input/output item on the screen is retained in source code as mapping information between identification information (for example, the column name) of each column of the database and identification information (for example, the ID attribute value of HTML) of the corresponding parts object.

Further, in the present embodiment, as will be described below, excluding part thereof, information and the like about text displayed in the label control, attribute values of the input/output control, and control processing in each parts object are not directly specified in source code but are externally retained as dictionary data associated with identification information on ID of a parts object or the corresponding column name or the like of the database. In an upper class from which a class implementing the function of a parts object is inherited, processing to optimize the display method of a control for each device is implemented as described above, and also, in an object having a function to draw the whole screen, processing to optimize the display method of the whole screen for each device, instead of individual controls, is implemented.

Due to such processing, the display method of the screen, the appearance, the attributes, and the like of a control displayed on the screen by a parts object can dynamically be changed in accordance with the device of the client terminal.

<System Configuration>

Figure 5:
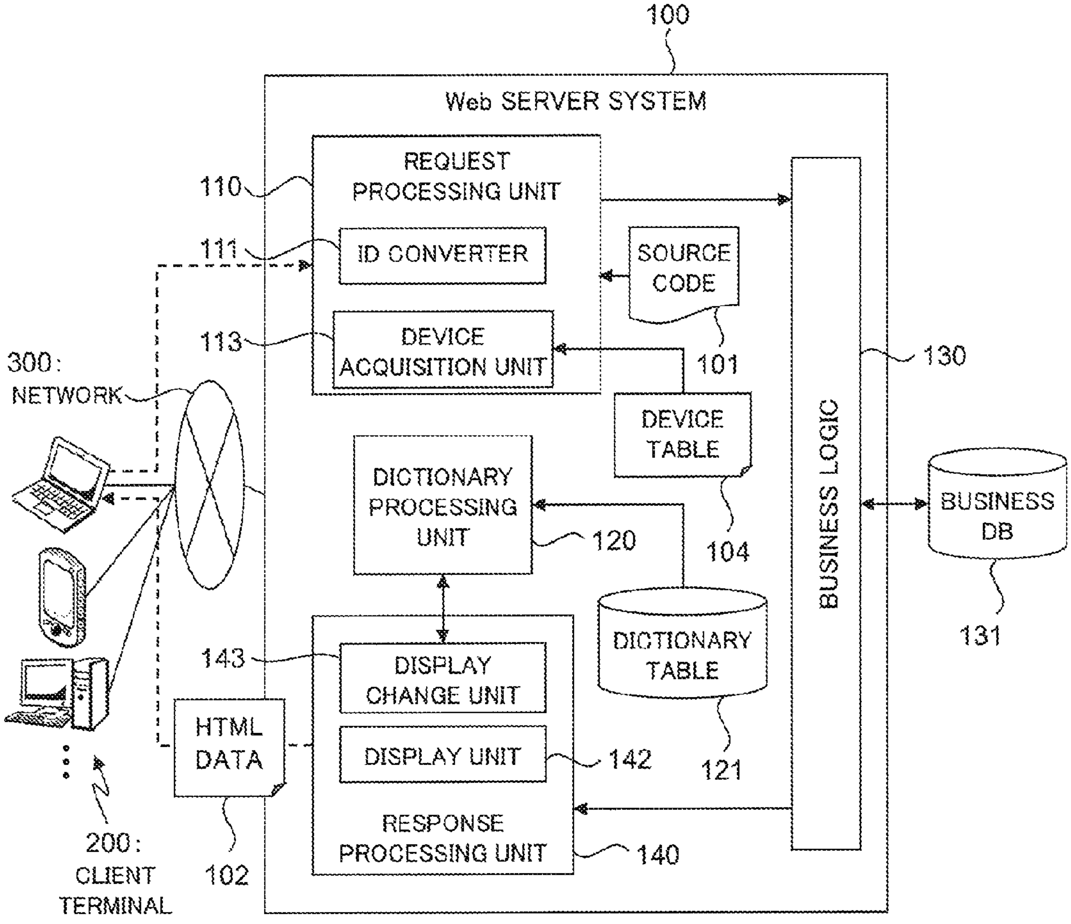
FIG. 5 is a diagram showing an overview of a configuration example of a multi-device support Web server system as a second embodiment of the present invention.

FIG. 5 is a diagram showing an overview of a configuration example of a multi-device support Web server system as the second embodiment of the present invention. The Web server system 100 has basically the same configuration as the example in FIG. 1 in the first embodiment, is made up of, for example, a computer device such as a server device or a virtual server in a cloud computing environment, and includes, in addition to middleware such as OS, DBMS, and a Web server program (not shown), each unit such as the request processing unit 110 implemented by the source code 101 created by a user or a software program such as a library or an object invoked therefrom, the dictionary processing unit 120, the business logic 130, and the response processing unit 140. Also, the dictionary table 121 implemented by a database, a file table, or the like is included.

In response to a request from a program such as a Web browser (not shown) on the client terminal 200 connected via the network 300 such as the Internet, the Web server system 100 provides a service by accessing the business database (DB) 131 through the business logic 130, performing processing, and outputting the HTML data 102 to the client terminal 200 to respond to the request. Incidentally, in the present embodiment, as the client terminal 200, for example, a plurality of types of devices different in size and resolution of the display and the presence/absence of the touch panel, including PCs, mobile phones, smartphones, tablet terminals, and the like can be utilized.

The request processing unit 110 has a function to invoke, in response to a request from the client terminal 200, content (business logic 130) based on the source code 101 corresponding thereto and includes units such as the ID converter 111 implemented by a software program and a device acquisition unit 113. The ID converter 111 has a function to convert identification information (ID) on a parts object corresponding to an input item on the screen contained in a request message into identification information (such as the column name) on the column of the business DB 131 corresponding to the input/output item based on mapping information retained in the source code 101.

The mapping information retains the correspondence between identification information (for example, the ID attribute value of HTML) on a parts object displayed on the screen and identification information (such as the column name) on each column of the business DB 131 to be accessed. Accordingly, as will be described below, each parts object arranged on the screen in the source code 101 first acquires the column name corresponding to ID of the parts object by the ID converter 111 and then can perform subsequent processing such as accessing the business DB 131 and acquiring dictionary data from the dictionary table 121 described below by using the column name as a key.

Thus, in the HTML data 102 responding to the client terminal 200, there is no need to directly specify the column name of the corresponding business DB 131 in a (control displayed by) each parts object as information such as a key, and ID of the parts object can be used as information such as a key, so that security can be increased by hiding the actual column name from the HTML data 102. Incidentally, the column name of the corresponding business DB 131 may directly be specified as information such as a key in a (control displayed by) each parts object in the HTML data 102 without making such a conversion.

The device acquisition unit 113 acquires information about the type of device of the client terminal 200 based on a request message. The information may include, for example, information determining the type of device and information identifying OS, a Web browser, the version thereof, and the like. The information can be acquired by a known technique, for example, from a User-Agent header of a request message. Incidentally, because there also arise some cases in which information on the size or resolution of the display cannot be determined from the information on the device obtained here, for example, the correspondence relation between the type of device and the resolution or the like may be retained as a device table 104 so that, when a new device is added, for example, the definition thereof can flexibly be added or changed.

Incidentally, in addition to the above functions, the request processing unit 110 may have a function of, for example, performing general validity checks of the content of data in an input item specified via a parts object on the screen. As types of validity checks, for example, the number of characters, character types (such as numbers, alphabets, kana, and half-width/full-width characters), limitations of usable characters, and format checks of the date/time and various code values can be considered, and the content thereof may be different.

In the present embodiment, therefore, a plurality of types of validity checks are implemented in a parts object or the like in advance, and which type to use for the target input item is to be selected or determined dynamically. Here, the dictionary table 121 is accessed via the dictionary processing unit 120 described below and information specified as the type of validity check is acquired and determined from the content of the dictionary data corresponding to the target input item.

The dictionary processing unit 120 has a function to acquire and output dictionary data corresponding to the specified key (in the present embodiment, for example, the column name of the business DB 131 corresponding to the target input/output item (parts object)) from the dictionary table 121. The content and format of dictionary data in the dictionary table 121 are not specifically limited. In the present embodiment, as a simple technique, for example, as will be described below, various kinds of data (attribute values of parts objects for carrying out input/output, parameters necessary for controlling, and the like) necessary for carrying out input/output processing of data to/from the target column of the business DB 131 via the screen are to be specified by commas or the like in a predetermined order.

More specifically, for example, the display name as the content when a label control is displayed in the corresponding parts object, the length (number of characters) when an input field is displayed as an input/output control, the specification related to the content of control processing such as the type of validity check and the mode of IME, the abbreviated display name as abbreviated text and display width when output data is listed as a table, and a value list when displayed as a dropdown list or the like can be considered.

The business logic 130 has a function to perform processing as a business application utilizing the business DB 131. In the present embodiment, as described above, the business logic 130 is intended for CRUD type applications on the business DB 131 but is not specifically limited to such applications.

The response processing unit 140 has a function to generate the HTML data 102 based on a processing result of the business logic 130 or the like based on the content of the source code 101 and return to the client terminal 200 and includes units such as the display unit 142 and a display change unit 143 implemented by a software program.

The display change unit 143 acquires text of the label control and parameter values of attribute values, control information, and the like of the input/output control, when a corresponding parts object of each output item contained in a returned response is displayed on the screen of the client terminal 200. Here, the dictionary table 121 is accessed via the dictionary processing unit 120 to acquire the display name and various parameter values such as attribute values from the dictionary data corresponding to the target output item (parts object). Also, based on information such as the type of device and the resolution of the display acquired by the device acquisition unit 113, the mode of screen display and adjustment content of the display method of a control displayed by a parts object are acquired.

The display unit 142 has a function to generate the HTML data 102 of a response screen in which controls displayed by each parts object are arranged based on text of the label control and parameter values of attribute values of the input/output control, control information, and the like on each parts object acquired by the display change unit 143. At this point, based on adjustment content acquired by the display change unit 143, the mode of screen display and the display method of a control are adjusted to be optimum for the target device.

<Screen Display Processing>

In the present embodiment, although an input/output item of a corresponding column is displayed by a parts object in a CRUD type application, processing therefor is similar to the content shown in FIG. 2 or FIG. 4 in the first embodiment, and thus, a repetitive description thereof is omitted here.

Figure 6:
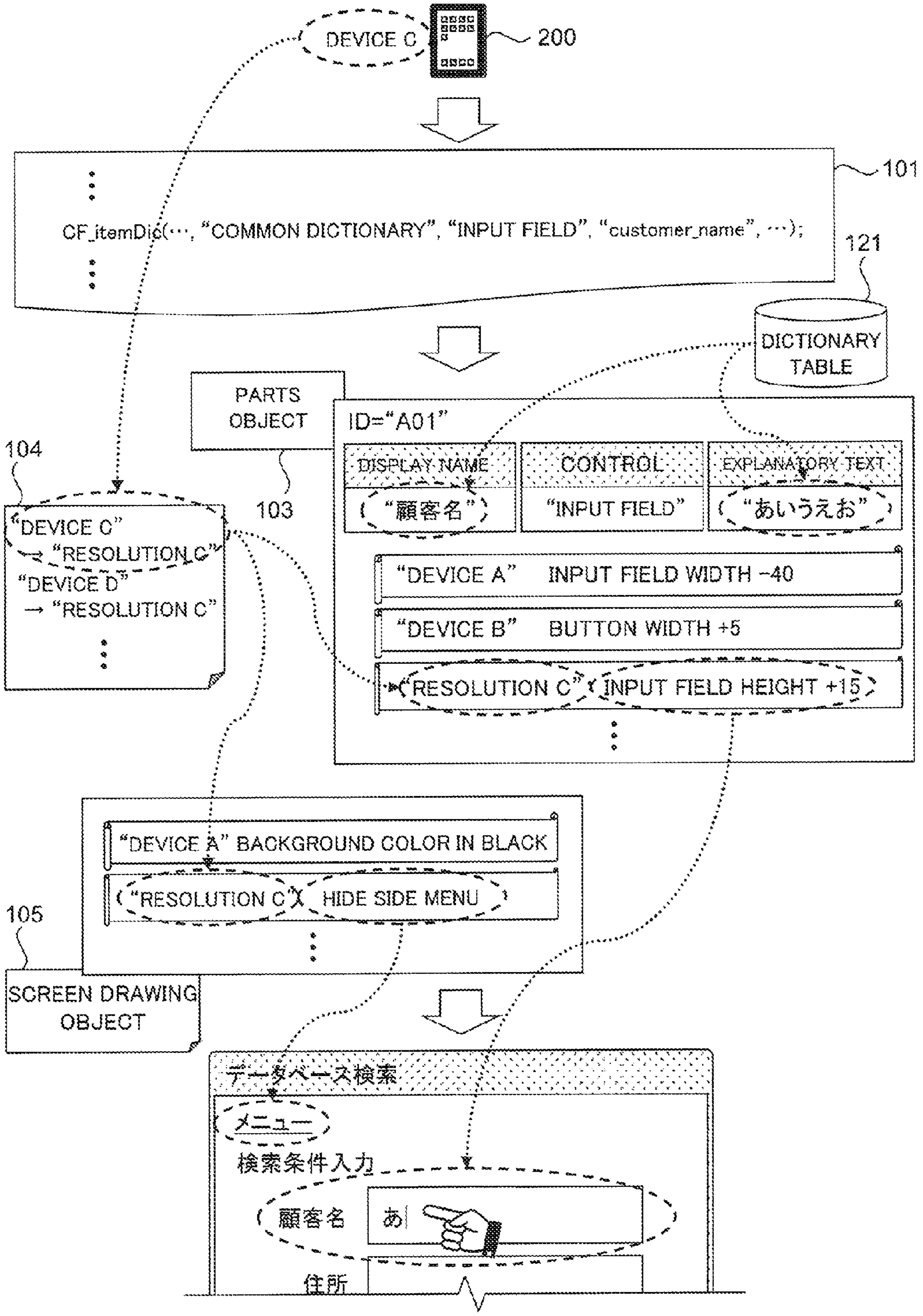
FIG. 6 is a diagram showing an overview of an example of processing when the appearance and the like of a control displayed by a parts object according to the second embodiment of the present invention is changed in accordance with a device of a client terminal.

FIG. 6 is a diagram showing an overview of an example of processing when the appearance and the like of a control displayed by the parts object 103 is changed in accordance with the device of the client terminal 200. Here, it is assumed that the definition for adjusting the display method of a control and processing thereof are implemented in advance for each type of device in an upper class from which the parts object 103 is inherited without changing the content of the source code 101 shown in the example of FIG. 2 in the first embodiment (in the example of FIG. 6, for convenience of description, the definition of adjustment content for “device A,” “device B,” and “resolution C” is shown in the parts object 103). The adjustment content is, for example, an adjustment of the width or height when a control such as an input field or a button is displayed.

Also, in a screen drawing object 105 that draws the whole screen, it is assumed that the definition for adjusting the mode of screen display and processing thereof are implemented in advance for each type of device (in the example of FIG. 6, the definition of adjustment content for “device A” and “resolution C” is shown). The adjustment content is, for example, an adjustment of color scheme such as the background color of the whole screen, the display method of a side menu, an arrangement policy of each control, and the like.

If, as shown in the example of FIG. 6, the type of device of the client terminal 200 acquired by the device acquisition unit 113 is “device C,” the device acquisition unit 113 refers to the device table 104 to check whether information on the corresponding resolution or the like is present. In the example of FIG. 6, “resolution C” is obtained as information on the resolution for “device C.”

The parts object 103 acquires information on adjustment content (in the example of FIG. 6, “set the height to 15 pixels plus when an input field is displayed”) when a control of “resolution C” is displayed by the function of the display change unit 143 and adjusts the appearance and the like of the input/output control displayed based on the adjustment content so as to be optimum for “device C” by the function of the display unit 142. For example, compared with the screen example of FIG. 2 in the first embodiment, the height of the input field of “顧客名” is increased.

The screen drawing object 105 (that is, part of the display unit 142) acquires information on adjustment content (in the example of FIG. 6, “hide the side menu”) when the whole screen of “resolution C” is displayed by the function of the display change unit 143 and adjusts the mode of screen display based thereon by the function of the display unit 142. For example, the side menu displayed by being expanded in the screen example of FIG. 2 in the first embodiment is collapsed and displayed as a link called “メニュー.”

Compared with PCs, tablet terminals and smartphones have high resolution but a smaller display in size, and further, a touch panel is frequently used for input/output. In this case, if, for example, the height of an input field is low or a button is small, it may become difficult to perform an operation by touching such a field or button with a finger and thus, in a device having such a touch panel, the display is optimized to avoid an erroneous operation when touched with a finger by increasing the size of the input field and the like (particularly by increasing the height) or increasing the interval between controls arranged vertically.

Also, because the size of the display is small, it is also possible to implement so that the mode of displaying the whole screen is changed to change the rules of arrangement by collapsing menus such as side menus or vertically arranging controls having been arranged horizontally to efficiently arrange controls.

As described above, by implementing processing to optimize the display for each device in an upper class from which the parts object 103 is inherited or in the screen drawing object 105, the source code 101 can be created when an application program is developed without being particularly conscious of the type of device of the client terminal 200. Also, when the supported type of device is added or the display mode is changed, the correction of the source code 101 can be made unnecessary only by adding or correcting processing content of an upper class from which the parts object 103 is inherited or the screen drawing object 105.

As described above, according to the Web server system 100 as the second embodiment of the present invention, the parts object 103 to display a control corresponding to an input/output item in a user interface of a Web application program and/or the screen drawing object 105 that displays the whole screen dynamically changes the screen itself and/or the user interface including the appearance and attributes of the control to display the input/output item on the screen based on the type of device of the client terminal 200, particularly the size or resolution of the display. Accordingly, the user interface can dynamically be optimized in accordance with the device of the client terminal 200 without changing the source code 101 of an application.

Incidentally, the present embodiment is intended for standard CRUD type Web applications but is not limited to such applications. Based on the same concept, the user can provide multi-device support by implementing the parts object 103 or the screen drawing object 105 for a specific application (which may be not only a Web application, but also a client/server type, standalone type, or the like) constructed in the form of combining the dictionary table 121 and the parts object 103, including operation content such as the user interface and business logic.

Also, in the present embodiment, the parts object 103 or the screen drawing object 105 is implemented such that the display screen is optimized in accordance with the size or resolution of the display of each device of the client terminal 200 or the presence/absence of a touch panel to provide multi-device support, but using a similar mechanism, the parts object 103 or the screen drawing object 105 can also be naturally implemented so as to support a multiplatform in which OS, Web browsers, versions thereof, and the like are different.

Third Embodiment

An application development support system as the third embodiment of the present invention is, for example, configured as a system operating a software program such as an application framework like RoR described above or IDE integrating the application framework and development functions such as the GUI creation function, version management, and build and has a function to automatically generate source code of Web application programs having a user interface including CRUD type Web applications on a database.

Here, for example, according to a known technique, information about the column configuration of the target database (table) is acquired by reading schema information managed by DBMS of a business database to be accessed by an application program. Based on the content thereof, according to a known technique, source code of a CRUD type Web application program having a predetermined screen design and operation content is automatically generated in an object-oriented programming language like, for example, Java (registered trademark), PHP (Hypertext Preprocessor), and Ruby. At this point, similarly to conventional technique, information on mapping between each column of the database and an input/output item on the screen is retained.

In the present embodiment, similarly to the first and second embodiments, for example, in a CRUD type Web application program accessing a business database, instead of directly using a standard control object (which may simply called a "control" hereinafter), a parts object, described below, in which the display name and each piece of data of the setting content, control processing, and explanatory text of a control are integrated is used to display the content related to an input/output item (for example, an input item to specify the content of search conditions to acquire data from the business database or an output item to display the content of a search result) on the screen.

Such a parts object can specify what kind of control (for example, a text control only, (a text control and) and an input field, (a text control and) a dropdown list, and the like) to display on the screen as a parameter. Also, the parts object can specify attribute values (for example, the content of text displayed in a text control and the length of an input field), control information (for example, how to perform a validity check of input data) on a control, and the like and is implemented to display and control the control according to the specified content.

In other words, the parts object is configured to combine and display an input/output control dealing with data of an input/output item such as the input field, dropdown list, and text and a label control as a text control that displays a name or the like of the input/output item and has a configuration that output patterns of these controls can be specified.

In this processing, attribute values of the label control and the input/output control, such as the width of controls, can be adjusted collectively in the form of consistency, and thus, there is no need to carry out a cumbersome process that the user individually specifies attribute values and the like to have consistency, so that the appearance of the displayed controls can be adjusted. The adjustments include, for example, adjusting each of the display width of the label control and the input/output control integrally to prevent the label control from being started as a new line at an unintended location in a displayable area or conversely to prevent the label control from not being started as a new line at an intended location.

The application development support system in the present embodiment generates source code under the assumption that the content of each input/output item on the screen is displayed using the parts object. That is, a control is indirectly displayed by using the parts object (at the time of execution on a Web server system, the parts object dynamically generates HTML, a script, and the like which display the target control). Also, information about mapping between each column of the database to be accessed by the application program and the input/output item on the screen is retained in source code as mapping information between identification information (for example, the column name) on each column of the database and identification information (for example, the ID attribute value of HTML) on the corresponding parts object.

Further, in the present embodiment, similarly to the first and second embodiments, as will be described below, excluding part thereof, information and the like about text displayed in the label control, attribute values of the input/output control, and control processing in each parts object are not directly specified in source code but are externally retained as dictionary data associated with identification information on ID of a parts object or the corresponding column name or the like of the database. The parts object reads dictionary data during execution and based on the content thereof, displays the label control or the input/output control. By setting, changing, or the like, the content of the dictionary data, the appearance and attributes of the control displayed on the screen by the parts object can dynamically be changed without changing the once-generated source code or if changed, by making simple changes only.

<System Configuration>

Figure 7:
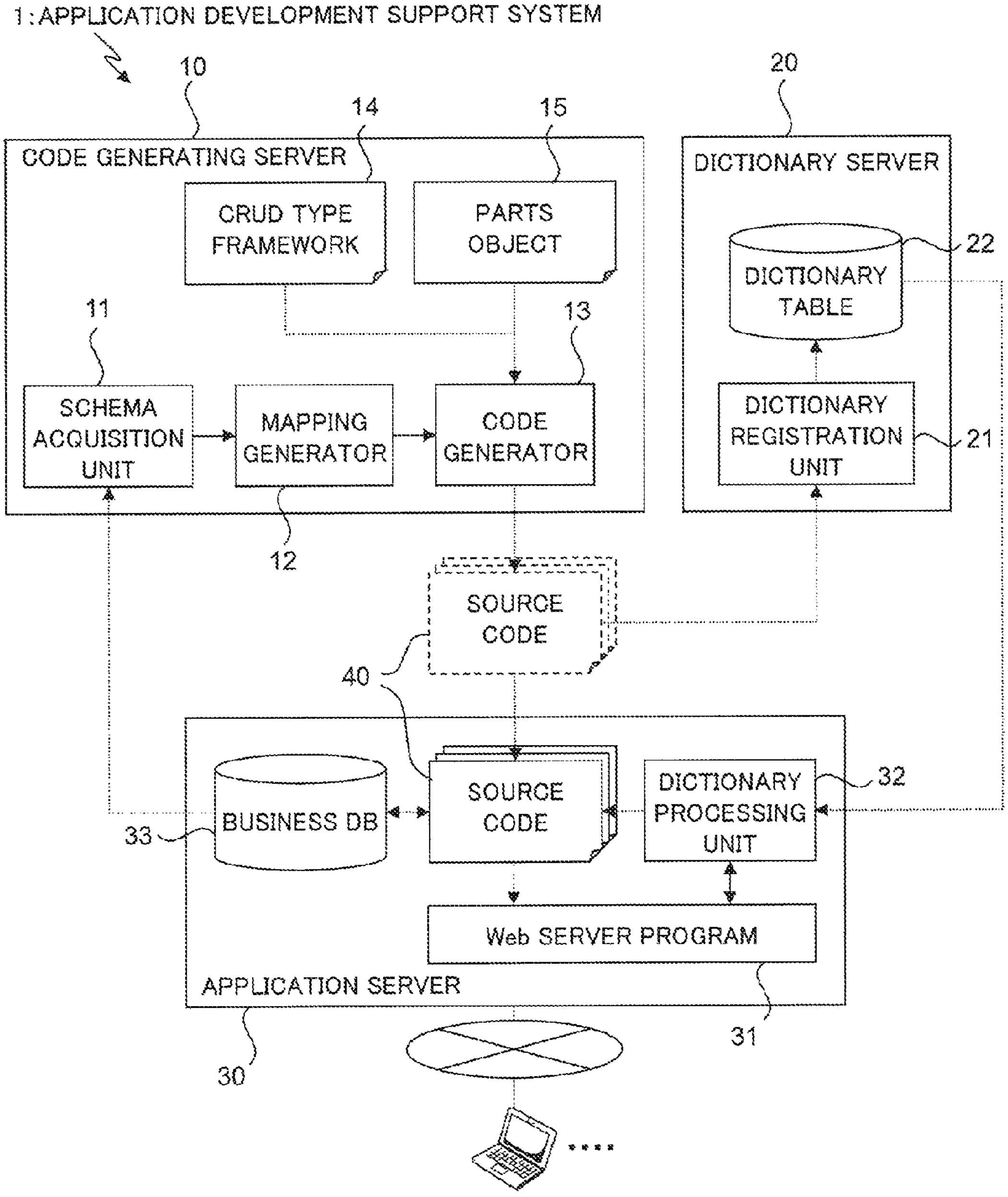
FIG. 7 is a diagram showing an overview of a configuration example of an application development support system as a third embodiment of the present invention.

FIG. 7 is a diagram showing an overview of a configuration example of an application development support system as the third embodiment of the present invention. An application development support system 1 includes, for example, a code generating server 10 made up of a computer device such as a PC, a server device, or a virtual server in a cloud computing environment, and a dictionary server 20. Source code 40 generated by the code generating server 10 is applied to an application server 30 that provides a service by executing a Web application program constituted by a module including the source code 40.

The code generating server 10 has a function to automatically generate the source code 40 (corresponding to the source code 101 in the first and second embodiments) for a CRUD type Web application program accessing a business database on the application server 30 and includes, for example, in addition to middleware such as OS and DBMS (not shown), each unit such as a schema acquisition unit 11, a mapping generator 12, and a code generator 13 implemented by software. In addition to these units, for example, a configuration that functions as IDE by including development functions such as the GUI creation function, version management, and build may be adopted.

The schema acquisition unit 11 reads, for example, according to a known technique, schema information about the business (DB) 33 (corresponding to the business DB 131 in the first and second embodiments) on the application server 30 (corresponding to the Web server system 100 in the first and second embodiments) and acquires information about the configuration of a column in each table in a business database DB 33. The acquired information includes, for example, identification information such as the name of each column and attribute values such as the data type and length.

The mapping generator 12 generates the correspondence relation between identification information, for example, the column name, as information on each column acquired by the schema acquisition unit 11 and information on ID set to a corresponding parts object 15 (that is, displaying the input/output item corresponding to the relevant column on the screen) (corresponding to the parts object 103 in the first and second embodiments) as mapping information. Incidentally, the content of the mapping information is output to the source code 40 by the code generator 13 described below.

The code generator 13 constructs, like conventional technique such as an application framework, for example, the aforementioned RoR, a standard CRUD type Web application program on the business DB 33 by a predefined CRUD type framework 14 based on information on each column acquired by the schema acquisition unit 11 and mapping information generated by the mapping generator 12 and generates and outputs the source code 40 thereof. By expanding the output source code 40 on the application server 30, the CRUD type Web application program accessing the business DB 33 can be operated.

Incidentally, in a CRUD type Web application generated in the present embodiment, when the content related to the input/output item corresponding to each column of the business DB 33 is displayed on the screen, as described above, instead of directly invoking a standard control, the parts object 15 is to be invoked to indirectly display the control in the source code 40.

On the other hand, the dictionary server 20 has a dictionary table 22 (corresponding to the dictionary table 121 in the first and second embodiments) retained by associating dictionary data including information and the like about text displayed in the label control, attribute values of the input/output control and control processing in each of the parts objects 15 arranged in the source code 40 with ID of the parts object 15 or identification information on the corresponding column name of the database and has a function to manage the dictionary table.

The dictionary server 20 includes, for example, in addition to middleware such as OS and DBMS (not shown), a dictionary registration unit 21 implemented by software. The dictionary registration unit 21 has a function to register an entry in the dictionary table 22. The content or format of dictionary data corresponding to a key (column name) is not specifically limited. In the present embodiment, as a simple technique, for example, as will be described below, various kinds of data (attribute values of the parts object 15 for carrying out input/output, parameters necessary for controlling, and the like) necessary for carrying out input/output processing of data to/from the target column of the business DB 33 via the screen are to be specified by commas or the like in a predetermined order.

As such data, similarly to the example shown in FIG. 2 in the first embodiment, for example, the display name as the content when a label control is displayed in the corresponding parts object 15, the length (number of characters) when an input field is displayed as an input/output control, the specification related to the content of control processing such as the type of validity check and the mode of IME, the abbreviated display name as abbreviated text and display width when output data is listed as a table, and a value list when displayed as a dropdown list or the like can be considered.

The processing to register dictionary data described above in the dictionary table 22 using each column name of the business DB 33 as a key may manually be performed by the developer or the like via the dictionary registration unit 21, or, as will be described below, the dictionary registration unit 21 may determine non-registered columns by collating mapping information retained in the source code 40 with the current registration state of the dictionary table 22 to additionally register such non-registered columns in the dictionary table 22. At this point, the user (developer or the like) may be allowed to select or specify columns to be registered.

Normally, a plurality of screens or a plurality of pieces of source code are created by an application program and among these screens or source code, the same column of the business DB 33 is repeatedly accessed frequently. That is, if information such as a parameter specifying the parts object 15 displayed as an input/output item for the same column is once registered in the dictionary table 22 as dictionary data, the registered entry can be reutilized by other screens and source code. Therefore, work efficiency when many screens or many pieces of the source code 40 accessing the same business DB 33 are developed can be improved.

The column name of the business DB 33 is used as a key in the dictionary table 22, and as described above, mapping information retained in the source code 40 retains the correspondence relation between identification information such as the name of each column and information on ID set to the corresponding parts object 15 (that is, displaying the input/output item corresponding to the relevant column on the screen). By utilizing the correspondence relation, there is no need for each of the parts objects 15 to directly specify the corresponding column name as information such as a key for HTML data generated during execution in the source code 40, and ID of the parts object 15 can be used as information such as a key, so that security can be increased by hiding the actual column name from the HTML data.

That is, as will be described below, each of the parts objects 15 first acquires the column name corresponding to ID of the parts object 15 in the HTML data via mapping information in the source code 40 and then accesses the dictionary table 22 using the column name as a key to acquire the corresponding dictionary data. Incidentally, without the conversion of ID described above by the mapping information in the source code 40, the column name of the business DB 33 corresponding to (a control displayed by) each of the parts objects 15 in the HTML data may directly be specified as information such as a key.

The application server 30 is a Web server constituted by a module including the source code 40 generated by the code generating server 10 to provide a service by executing a CRUD type Web application program accessing the business DB 33. The application server 30 includes, for example, in addition to OS and DBMS (not shown), middleware such as a Web server program 31. Also, a dictionary processing unit 32 and the like (corresponding to the dictionary processing unit 120 in the first and second embodiments) implemented by software is included.

The dictionary processing unit 32 has a function to acquire and output dictionary data (information and the like about text displayed in the label control, attribute values of the input/output control, and control processing by the parts object 15) corresponding to the specified key (in the present embodiment, the column name of the business DB 33 corresponding to the target input/output item (parts object 15) on the screen) from the dictionary table 22 of the dictionary server 20.

Accordingly, when the source code 40 is invoked and executed in the Web server program 31, as will be described below, each of the parts object 15 arranged in the source code 40 acquires the corresponding column name of the business DB 33 from ID of the parts object 15 in HTML data based on mapping information retained in the source code 40 and accesses the dictionary table 22 of the dictionary server 20 via the dictionary processing unit 32 using the value as a key to acquire dictionary data. Based on the content of the dictionary data, HTML data to display the label control and input/output control is generated.

Incidentally, information whether or not the parts object 15 arranged in the source code 40 uses dictionary data (whether or not the parts object 15 accesses the dictionary table 22) during execution of the application server 30 may be allowed to be set to the code generating server 10. The code generator 13 generates the source code 40 according to the content of the setting. When set not to use dictionary data, the label control and input/output control are displayed using the content directly specified in the source code 40 for the parts object 15 or default values predefined in the parts object 15. This is also applied to the case in which no dictionary data corresponding to the specified key is found in the dictionary table 22 under the setting condition of using dictionary data.

<Screen Display Processing>

In a CRUD type application operating on the application server 30 based on the generated source code 40, the input/output item of the corresponding column is displayed on the screen by the parts object 15, and processing therefor is similar to the content shown in FIG. 2 or FIG. 4 in the first embodiment, and thus, repetitive description thereof is omitted.

As described above, the source code 40 of a CRUD type Web application including a screen configuration and implementation of standard functions can automatically be generated from schema information on the business DB 33, in accordance with predetermined rules. However, when an application is actually utilized, there may be some cases in which the standard screen configuration should be changed or adjusted. For example, a desire to add, delete, or change part of an input/output item or to change or adjust an attribute value such as the size of an input field may arise. For such a case, in the present embodiment, the appearance, attributes, or the like of a control displayed on the screen can dynamically be changed by the parts object 15 without changing the once-generated source code 40 or if changed, by making simple changes only.

Figure 8:
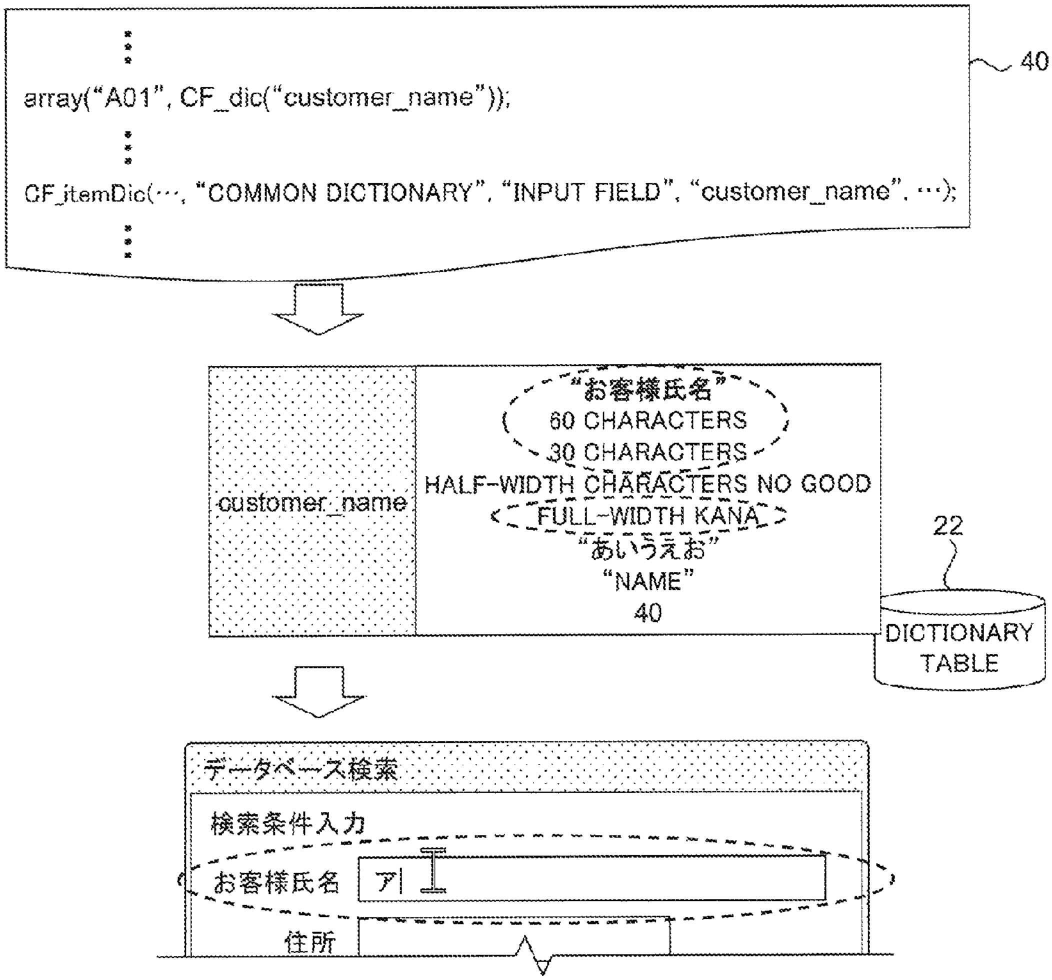
FIG. 8 is a diagram showing an overview of an example of processing when the appearance and the like of a control displayed by a parts object according to the third embodiment of the present invention is changed.

FIG. 8 is a diagram showing an overview of an example of processing when the appearance and the like of the control displayed by the parts object 15 is changed. Here, in the source code 40 and the dictionary table 22 of the same content as the example of FIG. 2 in the first embodiment, only the content of the dictionary table 22 is changed without changing the content of the source code 40. More specifically, the content of the name (from "顧客名" to "お客様名"), the length in the case of an input field (from 40 characters to 60 characters), the maximum length in the case of an input field (from 20 characters to 30 characters), and the initial mode of IME (from "full-width kana" to "full-width katakana") is changed.

Accordingly, when the relevant Web application is executed, the parts object 15 refers to the content of the relevant entry in the dictionary table 22 and in accordance with the content thereof, can dynamically change, as shown in a screen example in a lower portion of FIG. 8, not only text data of the label control as the display name, but also attributes (in the example of FIG. 8, the length (width) of the input field, the mode of IME, and the like) of the input/output control.

According to the application development support system 1 as the third embodiment of the present invention, as described above, by reading schema information on the business DB 33 to be accessed on the application server 30, the code generating server 10 acquires information about the configuration of the column of the business DB 33 and based on the content thereof, according to a known technique, automatically generates the source code 40 of a standard CRUD type Web application program on the business DB 33 in accordance with a preset screen design and operation content. At this point, the source code 40 is generated under the assumption that instead of directly using a standard control to display the content related to an input/output item on the screen, a standard control is indirectly displayed by using the parts object 15.

Further, parameters of attribute values and control information when a control is actually displayed by each of the parts controls 15, excluding part thereof, are not specified directly in the source code 40, but are configured to be retained in the dictionary table 22 of the dictionary server 20 as dictionary data associated with ID or the like of the parts object 15. Accordingly, by changing the content of the dictionary data of the dictionary table 22, a development technique of completing an application while dynamically changing or adjusting the appearance or attributes of a control displayed on the screen by the parts object 15 during execution on the code generation server 10 without changing the once-generated source code 40 or if changed, by making simple changes only can be adopted.

Figure 9:
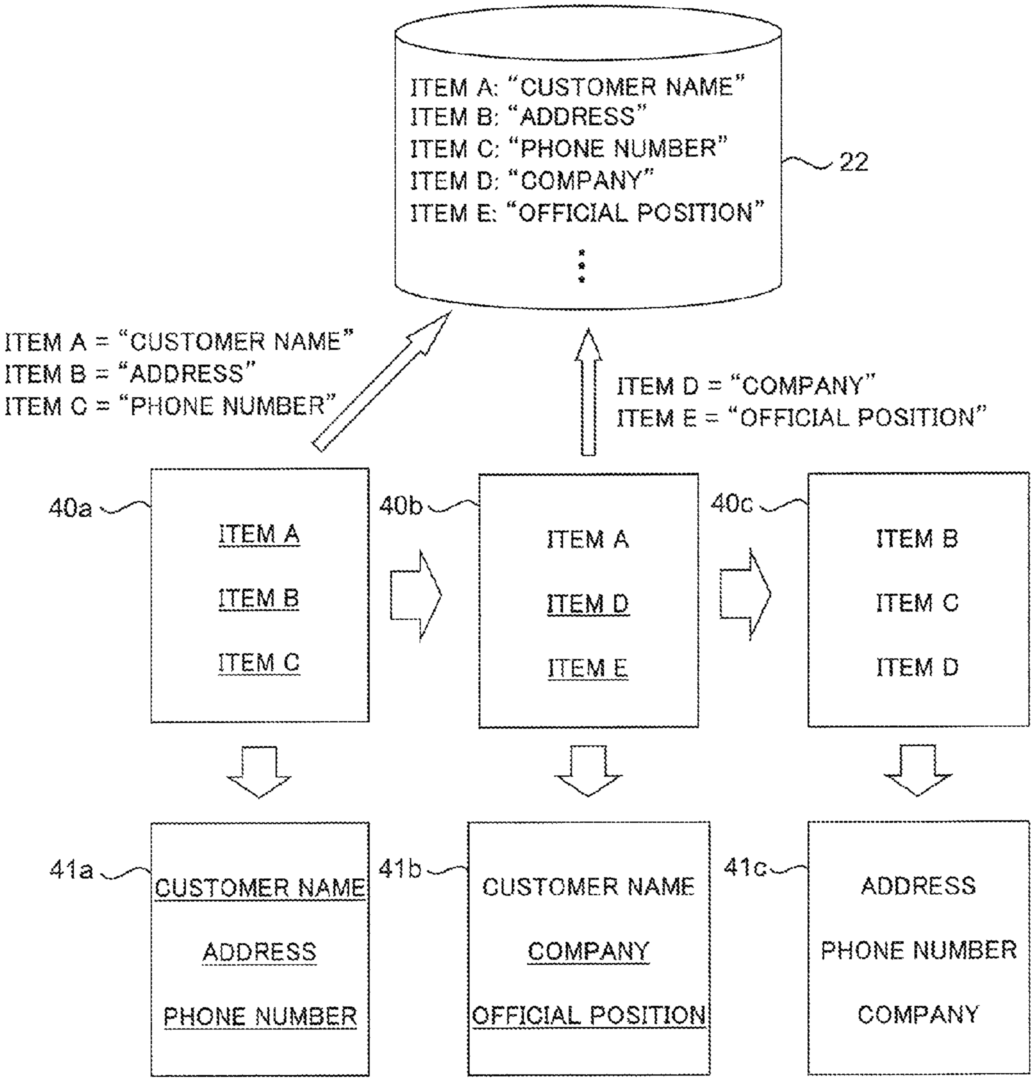
FIG. 9 is a diagram showing an overview of the generation of source code when entries are registered in a dictionary table according to the third embodiment of the present invention.

With entries corresponding to each column of the business DB 33 being registered in the dictionary table 22 and necessary data being on the table, the efficiency of development work can be improved. FIG. 9 is a diagram showing an overview of the generation of the source code 40 when entries are registered in the dictionary table 22. When source code 40*a* in FIG. 9 is generated, text of the display name corresponding to each of three items A, B, and C is newly registered in the dictionary table 22. Then, when source code 40*b* for another screen is generated, entries of items A, D, and E are registered in the dictionary table 22, respectively, and registration work for the item A is not needed because the item A is already registered.

Similarly, when source code 40*c* for still another screen is generated, no registration work is needed because all these items B, C, and D contained therein are already registered in the dictionary table 22. Such exclusion of duplicate registration may, as described above, manually be determined by the developer, for example, or the dictionary registration unit 21 of the dictionary server 20 may determine input/output items for which a registration is needed by collating mapping information in the source code 40 with entries of the dictionary table 22. Thus, as the content of the dictionary table 22 is getting adjusted as described above, the need to repeatedly set attribute values and the like to display a control of the same input/output item each time the source code 40 is generated for the screen is eliminated, leading to improvements of development efficiency.

In the present embodiment, source code for a standard CRUD type Web application is automatically generated, but the present embodiment is not limited to such an example. Based on the same concept, source code may automatically be generated for a specific application (which may be not only a Web application, but also a client/server type, stand-alone type, or the like) constructed by the user in the form of combining the parts object 15 and access to the dictionary table 22, also including operation content such as the user interface and business logic.

In the foregoing, the invention made by the inventor of the present invention has been concretely described based on the embodiments. However, it is needless to say that the present invention is not limited to the foregoing embodiments and various modifications and alterations can be made within the scope of the present invention. For example, the above embodiments are described in detail to make the present invention easier to understand and are not necessarily limited to embodiments including all described elements. Also, part of the configuration of a certain embodiment may be replaced by the configuration of another embodiment, and the configuration of a certain embodiment may be added to the configuration of another embodiment. Also, additions, deletions, or substitutions of other configurations can be made for part of the configuration of each embodiment.

INDUSTRIAL APPLICABILITY

The present invention can be utilized for development techniques of applications in a Web server system.

EXPLANATION OF REFERENCE CHARACTERS

1 . . . Application development support system, 10 . . . Code generating server, 11 . . . Schema acquisition unit, 12 . . . Mapping generator, 13 . . . Code generator, 14 . . . CRUD type framework, 15 . . . Parts object, 20 . . . Dictionary server, 21 . . . Dictionary registration unit, 22 . . . Dictionary table, 30 . . . Application server, 31 . . . Web server program, 32 . . . Dictionary processing unit, 40, 40*a* to *c* . . . Source code, 41, 41*a* to *c* . . . HTML data, 100 . . . Web server system, 101 . . . Source code, 102 . . . HTML data, 103 . . . Parts object, 104 . . . Device table, 105 . . . Screen drawing object, 110 . . . Request processing unit, 111 . . . ID converter, 112 . . . Input check unit, 113 . . . Device acquisition unit, 120 . . . Dictionary processing unit, 121 . . . Dictionary table, 130 . . . Business logic, 131 . . . Business database (DB), 140 . . . Response processing unit, 141 . . . Translation unit, 142 . . . Display unit, 143 . . . Display change unit, 200 . . . Client terminal, 300 . . . Network.

The invention claimed is:

1. An application development support system, stored in a memory, that generates source code of a Web application program operating on an application server, the application development support system comprising:

a dictionary table that uses identification information on one or more input/output items displayed on a screen during execution of the Web application program as a key to retain, as dictionary data, information made up of initial values of one or more parameters of a parts object having at least information on a display name showing text of a label control of the input/output item and information about an input/output control displayed to carry out input or output of the input/output item;

a code generator that constructs the Web application program by invoking the parts object for displaying each of the input/output items on the screen and generates the source code of the constructed Web application program, a schema acquisition unit that acquires information about a configuration of each column of a business database by reading schema information on the business database accessed by the Web application program on the application server; and a mapping generator that generates mapping information about mapping between identification information on the parts object and the identification information on the input/output item and registers the dictionary data by setting identification information on each of the columns of the business database as the identification information on the input/output item in the dictionary table, wherein when invoked to display a corresponding input/output item on the screen during execution of the Web application program on the application server, the parts object acquires the identification information on the input/output item from the mapping information based on the identification information on the parts object, uses the acquired identification information on the input/output item as the key to acquire information on part or all of the parameters of the parts object from the dictionary table, and based on the acquired parameters, displays the input/output item.

2. The application development support system according to claim 1, wherein the code generator generates a create, read, update and delete (CRUD) type application for the business database based on a framework of the CRUD type application.

3. The application development support system according to claim 1, wherein the parts object performs display control such that the label control is displayed in combination with a specified type of the input/output control or the label control and/or the input/output control is not displayed during execution of the Web application program on the application server, and when generating the source code of the Web application program, the code generator generates the source code such that the parts object is invoked by specifying a predetermined initial value identifying contents of the display control.

4. The application development support system according to claim 1, wherein the parts object implements control processing in accordance with the input/output control displayed, and the dictionary table can register information for specifying contents of the control processing as a parameter of the parts object in the dictionary data.

5. The application development support system according to claim 1, further comprising:

a dictionary registration unit that registers an entry made up of the key and the dictionary data in the dictionary table, wherein the dictionary registration unit determines the identification information on the input/output item necessary for registration in the dictionary table based on the mapping information retained in the source code generated by the code generator and the entry registered in the dictionary table.

6. The application development support system according to claim 1, comprising:

a dictionary server; and a code generating server that generates the source code of the Web application program, wherein the dictionary table is included in the dictionary server, and each of the code generator, the schema acquisition unit, and the mapping generator is included in the code generating server.

7. The application development support system according to claim 6, wherein the code generator of the code generating server generates a create, read, update and delete (CRUD) type application for the business database based on a framework of the CRUD type application.

8. The application development support system according to claim 6, wherein the parts object performs display control such that the label control is displayed in combination with a specified type of the input/output control or the label control and/or the input/output control is not displayed during execution of the Web application program on the application server, and when generating the source code of the Web application program, the code generator of the code generating server generates the source code such that the parts object is invoked by specifying a predetermined initial value identifying contents of the display control.

9. The application development support system according to claim 6, wherein the parts object implements control processing in accordance with the input/output control displayed, and the dictionary table of the dictionary server can register information for specifying contents of the control processing as a parameter of the parts object in the dictionary data.

10. The application development support system according to claim 6, wherein the dictionary server includes a dictionary registration unit that registers an entry made up of the key and the dictionary data in the dictionary table, and the dictionary registration unit determines the identification information on the input/output item necessary for registration in the dictionary table based on the mapping information retained in the source code generated by the code generator of the code generating server and the entry registered in the dictionary table.

11. An application development support method in an application development support system, stored in a memory, that generates source code of a Web application program operating on an application server, the application development support system having a dictionary table that uses identification information on one or more input/output items displayed on a screen during execution of the Web application program as a key to retain, as dictionary data, information made up of initial values of one or more parameters of a parts object having at least information on a display name showing text of a label control of the input/output item and information about an input/output control displayed to carry out input or output of the input/output item, the application development support method comprising:

a procedure of acquiring information about a configuration of each column of a business database by reading schema information on the business database accessed by the Web application program;

a procedure of generating mapping information about mapping between identification information on the parts object and the identification information on the input/output item;

a procedure of registering the dictionary data by setting identification information on each of the columns of the business database as the identification information on the input/output item in the dictionary table; and a procedure of constructing the Web application program by invoking the parts object to display each of the input/output items on the screen and generating the source code of the constructed Web application program, wherein when invoked to display a corresponding input/output item on the screen during execution of the Web application program on the application server, the parts object acquires the identification information on the input/output item from the mapping information based on the identification information on the parts object, uses the acquired identification information on the input/output item as the key to acquire information on part or all of the parameters of the parts object from the dictionary table, and based on the acquired parameters, displays the input/output item.

12. An application development support system that generates source code of a Web application program operating on an application server, comprising:

a dictionary table that uses identification information on one or more input/output items displayed on a screen during execution of the Web application program as a key to retain, as dictionary data, information made up of initial values of one or more parameters of a parts object having at least information on a display name showing text of a label control of the input/output item and information about an input/output control displayed to carry out input or output of the input/output item; and at least one hardware processor configured to acquire information about a configuration of each column of a business database by reading schema information on the business database accessed by the Web application program, generate mapping information about mapping between identification information on the parts object and the identification information on the input/output item, register the dictionary data by setting identification information on each of the columns of the business database as the identification information on the input/output item in the dictionary table, and construct the Web application program by invoking the parts object to display each of the input/output items on the screen and generating the source code of the constructed Web application program, wherein when invoked to display a corresponding input/output item on the screen during execution of the Web application program on the application server, the parts object acquires the identification information on the input/output item from the mapping information based on the identification information on the parts object, uses the acquired identification information on the input/output item as the key to acquire information on part or all of the parameters of the parts object from the dictionary table, and based on the acquired parameters, displays the input/output item.

* * * * *